(12) United States Patent
Huang et al.

(10) Patent No.: US 11,018,980 B2
(45) Date of Patent: May 25, 2021

(54) DATA-INTEROPERABILITY-ORIENTED TRUSTED PROCESSING METHOD AND SYSTEM

(71) Applicant: PEKING UNIVERSITY, Beijing (CN)

(72) Inventors: Gang Huang, Beijing (CN); Huaqian Cai, Beijing (CN); Ying Zhang, Beijing (CN); Xuanzhe Liu, Beijing (CN); Yun Ma, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/082,492

(22) Filed: Oct. 28, 2020

(65) Prior Publication Data
US 2021/0126867 A1 Apr. 29, 2021

(30) Foreign Application Priority Data
Oct. 28, 2019 (CN) .......................... 201911032663.0

(51) Int. Cl.
*H04L 12/803* (2013.01)
*H04L 29/08* (2006.01)
(Continued)

(52) U.S. Cl.
CPC ........ *H04L 47/125* (2013.01); *G06F 16/2471* (2019.01); *H04L 45/20* (2013.01);
(Continued)

(58) Field of Classification Search
CPC . H04L 47/125; H04L 67/101; H04L 67/1093; H04L 67/1029; H04L 45/20;
(Continued)

(56) References Cited

U.S. PATENT DOCUMENTS

2011/0055237 A1\* 3/2011 Veanes .................... G06F 16/33
707/759
2012/0123984 A1\* 5/2012 Nagpal ............... G06F 16/2438
706/21
(Continued)

FOREIGN PATENT DOCUMENTS

CN 106503589 A 3/2017
CN 106788987 A 5/2017
(Continued)

OTHER PUBLICATIONS

LiJie Ge, "Design and Implementation of Transaction Storage and Query System Based on BlockChain", China Master's Theses Full-text Database, Jan. 5, 2018.
(Continued)

*Primary Examiner* — Jung H Park
(74) *Attorney, Agent, or Firm* — Bayramoglu Law Offices LLC

(57) ABSTRACT

A data-interoperability-oriented trusted processing method and system applied to a P2P network system are provided. The P2P network system includes a plurality of nodes. The trusted processing method includes a storage method and a query method. Firstly, a directed acyclic graph ledger structure is employed to be matched with an nRW consensus mechanism during a storage process, so that a supervision problem in a large-scale sharing exchange process is solved. Secondly, in a query process, a P2P network system is optimized by maintaining a tree structure with high fault tolerance and load balance through a hop optimization method to construct the P2P network system with a relatively balanced network, so that a query delay is not greatly influenced on the premise of ensuring the load balance, and an expandability of the system is ensured.

9 Claims, 12 Drawing Sheets

(51) Int. Cl.
  *H04L 12/733* (2013.01)
  *G06F 16/2458* (2019.01)
(52) U.S. Cl.
  CPC ........ *H04L 67/101* (2013.01); *H04L 67/1029* (2013.01); *H04L 67/1048* (2013.01); *H04L 67/1055* (2013.01); *H04L 67/1059* (2013.01); *H04L 67/1093* (2013.01)
(58) Field of Classification Search
  CPC ............. H04L 67/1048; H04L 67/1055; H04L 67/1059; G06F 16/2471
  See application file for complete search history.

(56) References Cited

U.S. PATENT DOCUMENTS

| | | | | |
|---|---|---|---|---|
| 2016/0191417 | A1* | 6/2016 | Lutz | H04W 72/0486 370/336 |
| 2017/0132615 | A1 | 5/2017 | Castinado et al. | |
| 2020/0372029 | A1* | 11/2020 | Betawadkar-Norwood | G06F 16/24556 |

FOREIGN PATENT DOCUMENTS

| | | |
|---|---|---|
| CN | 106920167 A | 7/2017 |
| CN | 109697606 A | 4/2019 |

OTHER PUBLICATIONS

Wanjun Yu, et al, "Research on network trading system based on block chain technology", Modern Electronics Technique, vol. 42 No. 12, Jun. 15, 2019, DOI : 10.16652/j.issn.1004 373x.2019.12.006.

Yujie Xu, et al, "Research on Application of Block Chain in Distributed Energy Transaction", 2017 IEEE 3rd Information Technology and Mechatronics Engineering Conference(ITOEC), Dec. 30, 2017.

* cited by examiner

| S401 — In the P2P network system, acquire, by a first node, a query request broadcast by a father node thereof, the first node being any node in the P2P network system |

| S402 — Broadcast, by the first node, the query request to a child node thereof through a tree maintenance program; wherein the child node is used to broadcast the query request to a corresponding child node thereof by using a tree structure of the P2P network system, and the corresponding child node thereof repeats the above broadcasting step until the query request is broadcast to all nodes on the P2P network system; each node retrieves a local database after receiving the query request, and waits for a result of the child node thereof, and performs settlement and deduplication operations after data returned by all the child nodes is collected, and returns a result to the father node thereof; after rounds of feedback, when the root node receiving the query request of a user receives the results returned by all the child nodes, the root node performs final settlement and deduplication operations to generate a final query result and return the final query result to the user |

FIG. 4

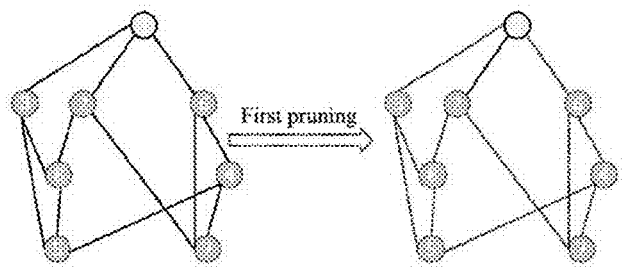

FIG. 5A

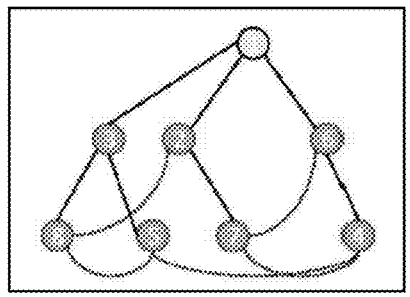

FIG. 5B

```
{
    "transactions": [
        {
            "transactionID": "ad8ecf5b-ce69-497b-5559-b9687398a025",
            "from": "3383b0c0-39e3-48c1-5fe3-d1fa2bdb119b",
            "to": "6d02d831-9b9e-47dc-4f20-e688a50f3f0d",
            "timeStamp": 1557662751556,
            "data": "QSBmYWlyIHVuZGVyc3RhbmRpbmcgb2Yg",
            "signature": "NGRlNmEwYzQtNWU2Yy00NDJlLTdmN2MtOWJiMmI2ODk0M2Jh",
            "type": "end contract"
        }
    ],
    "length":1
}
```

FIG. 10B

DATA-INTEROPERABILITY-ORIENTED TRUSTED PROCESSING METHOD AND SYSTEM

CROSS REFERENCE TO THE RELATED APPLICATIONS

This application is based upon and claims priority to Chinese Patent Application No. 201911032663.0, filed on Oct. 28, 2019, the entire contents of which are incorporated herein by reference.

TECHNICAL FIELD

The disclosure relates to the field of blockchain technologies, and more particularly, to a data-interoperability-oriented trusted processing method and a data-interoperability-oriented trusted processing system.

BACKGROUND

As a core force to drive the development of digital economy, and also a key factor to improve a smart level and operational efficiency of information society, data resources are regarded as strategic assets to determine future competitiveness. How to turn the huge data resources formed by the government, enterprises and institutions into assets and make the data resources become "new oil" to support the rise of the digital economy is a key challenge for the development of the digital economy. To exert values of the data assets is a process of making data "move". Safe and trusted flow and processing integration of high-quality, high-availability and high-efficiency data assets is an important foundation to support big data analysis, circulation and application realization, thus promoting the development of digital economy. Government, enterprises and other institutions have a large number of high-value core data. How to effectively guarantee safe and trusted sharing, flow and integration of the data assets, and prevent theft, abuse and misuse are the key issues in the process of trusted data circulation.

The value of the big data lies in that the data is used by people. However, due to the out-of-control problem of direct data interoperability, it is difficult to share and exchange trusted data. Traditional trusted exchange infrastructures, such as Bitcoin, Ethereum and other blockchains, emphasize "currency transaction", and the whole platform is designed under the premise of "avoiding double spend attack". A chain structure ledger is adopted, and a globally unified longest chain is synchronously maintained through a whole network consensus mechanism, which is low in transaction throughput, high in transaction cost and is not extendable, so that the traditional trusted exchange infrastructures cannot be applied to scenarios with high real-time requirements and high throughput, such as banks and exchanges.

Therefore, it is necessary to build an infrastructure for a data sharing and exchanging scenario. The data sharing and exchanging scenario mainly has the following requirements: 1. a supervision problem in the large-scale sharing and exchanging process is solved; 2. when a number of nodes and TPS (transactions per second) of the whole network increase, an extendibility of a query function is guaranteed; and 3. under the dynamic changes of an online state of nodes in the network and a link connection state between the nodes, relevant data of all nodes is retrieved to support a consensus algorithm and ensure fault tolerance of the query function.

SUMMARY

The disclosure provides a data-interoperability-oriented trusted processing method and a data-interoperability-oriented trusted processing system so as to overcome problems of difficult supervision, inextensibility and poor fault tolerance in a data sharing and exchanging scenario.

In order to solve the foregoing problems, the disclosure discloses a data-interoperability-oriented trusted processing method, wherein the method is applied to a peer-to-peer (P2P) network system, the P2P network system includes a plurality of nodes, the nodes include an Active List and a Passive List, and the Active List comprises an Eager List and a Lazy List; wherein a quantity of nodes in the Active List is a fixed value, and nodes establishing a transmission control protocol (TCP) connection with the nodes on the P2P network system are stored in the Eager List for transmitting messages; remaining nodes in the Active List excluding the Eager List are stored in the Lazy List, and are used for transmitting a message digest or message ID, and used for optimization and fault tolerance of the P2P network system; random nodes are stored in the Passive List, and are used for replacing disconnected nodes in the Active List, to ensure a connection between the nodes and a network in the P2P network system; the method includes a storage method and a query method;

the storage method includes:

in a process of initiating a transaction, randomly selecting, by a transaction initiating node in the P2P network system, a plurality of witness nodes from the P2P network system for witnessing the transaction;

packaging, by the witness nodes, transaction data generated by witnessing the transaction to generate blocks;

randomly selecting, by the witness nodes, a plurality of storage nodes from the P2P network system;

sending, by the witness nodes, the blocks to the plurality of storage nodes; and storing, by the storage nodes, the blocks, wherein, for one transaction, all the blocks of all the witness nodes and all the storage nodes form a directed acyclic graph DAG structure; and the query method includes:

in the P2P network system, acquiring, by a first node, a query request broadcast by a father node of the first node, the first node being any node in the P2P network system;

broadcasting, by the first node, the query request to a child node of the first node through a tree maintenance program; wherein the child node is used to broadcast the query request to a corresponding child node thereof by using a tree structure of the P2P network system, and the corresponding child node thereof repeats the above broadcasting step till the query request has been broadcast to all nodes on the P2P network system; each of the nodes retrieves a local database after receiving the query request, waits for a result of the child node thereof, and after data returned by all the child nodes is collected, performs settlement and de-duplication operations, and returns a result to the father node thereof; after rounds of feedback, when the root node receiving the query request of a user receives the results returned by all the child nodes, the root node performs final settlement and de-duplication operations to generate a final query result and returns the final query result to the user;

the tree maintenance program includes an extensible maintenance program and a fault-tolerant maintenance program;

for the extensible maintenance program, the query method includes:

when the first node broadcasts the query request to the child node thereof, sending, by the first node, an IHAVE message to a second node in the child node thereof, the IHAVE message including a message ID;

checking, by the second node, whether a NORMAL message corresponding to the message ID and used for transmitting the query request is received by the second node;

if the second node does not receive the NORMAL message corresponding to the message ID within a timeout period, performing the following steps of:

generating, by the second node, a GRAFT message for repairing the P2P network system; the GRAFT message including the message ID and a request for receiving the IHAVE message; and by the second node, sending the GRAFT message to the first node, and moving the first node from a Lazy List to an Eager List thereof, so that the first node repairs the P2P network system;

if the second node receives the NORMAL message corresponding to the message ID within the timeout period, performing the following steps of:

calculating, by the second node, a difference between receiving hops of the IHAVE message and receiving hops of the NORMAL message;

determining, by the second node, whether the hop difference exceeds a hop threshold; and if the hop difference exceeds the hop difference, repairing, by the second node, the P2P network system; and for the fault-tolerant maintenance program, the query method includes:

when a connection between the first node and the second node constituting edges of the P2P network system is disconnected, removing, by the first node, the second node from the Eager List thereof;

initiating, by the first node, a query request to first target nodes in a Passive List thereof in sequence; the query request including an instruction to check whether the first target nodes are online and an instruction to query a size of a Lazy List of the first target node;

by the first node, receiving query results returned by the first target nodes for the query requests, and selecting a second target node with a smallest Lazy List and a lowest delay from the first target nodes according to delays in the query results and the sizes of the Lazy Lists of the first target nodes; and by the first node, adding the second target node to the Lazy List thereof, and using nodes in the Lazy List as substitute edges to repair the P2P network system.

In order to solve the foregoing problems, the disclosure further discloses a data-interoperability-oriented trusted processing system, wherein the method is applied to a P2P network system, the P2P network system includes a plurality of nodes, the nodes include an Active List and a Passive List, and the Active List comprises an Eager List and a Lazy List; wherein a quantity of nodes in the Active List is a fixed value, and nodes establishing a TCP connection with the nodes on the P2P network system are stored in the Eager List for transmitting messages; remaining nodes in the Active List excluding the Eager List are stored in the Lazy List, and are used for transmitting a message digest or message ID, and used for optimization and fault tolerance of the P2P network system; random nodes are stored in the Passive List, and are used for replacing disconnected nodes in the Active List, to ensure a connection between the nodes and a network in the P2P network system; the system includes a storage device and a query device the storage device includes:

a witness-node selecting module provided in a transaction initiating node in the P2P network system and used to, in a process of initiating a transaction, randomly select a plurality of witness nodes from the P2P network system for witnessing the transaction;

a transaction-data packaging module provided in the witness node and used to package transaction data generated by witnessing the transaction to generate blocks;

a storage-node selecting module provided in the witness node and used to randomly select a plurality of storage nodes from the P2P network system;

a block sending module provided in the witness node and used to send the blocks to the plurality of storage nodes; and a block storing module provided in the storage nodes and used to store the blocks, wherein, for one transaction, all the blocks of all the witness nodes and all the storage nodes form a directed acyclic graph DAG structure;

the query device includes:

a query-request acquiring module provided in the first node and used to acquire a query request broadcast by a father node thereof in the P2P network system, the first node being any node in the P2P network system;

a query-request broadcasting module provided in the first node and used to broadcast the query request to a child node thereof through a tree maintenance program; wherein the child node is used to broadcast the query request to a corresponding child node thereof by using a tree structure of the P2P network system, and the corresponding child node thereof repeats the above broadcasting step till the query request has been broadcast to all nodes on the P2P network system; each of the nodes retrieves a local database after receiving the query request, waits for a result of the child node thereof, and after data returned by all the child nodes is collected, performs settlement and de-duplication operations, and returns a result to the father node thereof; after rounds of feedback, when the root node receiving the query request of a user receives the results returned by all the child nodes, the root node performs final settlement and de-duplication operations to generate a final query result and returns the final query result to the user;

the tree maintenance program includes an extensible maintenance program and a fault-tolerant maintenance program;

for the extensible maintenance program, the query device includes:

an IHAVE-message sending module provided in the first node and used to, when the first node broadcasts the query request to the child node thereof, send, by the first node, an IHAVE message to a second node in the child node thereof, the IHAVE message including a message ID;

a NORMAL-message checking module provided in the second node and used to check whether a NORMAL message corresponding to the message ID and used for transmitting the query request is received by the NORMAL-message checking module;

a GRAFT-message generating module provided in the second node and used to generate a GRAFT message for repairing the P2P network system when the NORMAL message corresponding to the message ID is not received within a timeout period; the GRAFT message including the message ID and a request for receiving the IHAVE message; and a GRAFT-message sending module provided in the second node and used to, when the NORMAL message corresponding to the message ID is not received within the timeout period, send the GRAFT message to the first node, and move the first node from a Lazy List to an Eager List thereof, so that the first node repairs the P2P network system;

a hop-difference calculating module provided in the second node and used to calculate a difference between receiving hops of the IHAVE message and receiving hops of the NORMAL message when the NORMAL message corresponding to the message ID is received within the timeout period;

a hop-difference determining module provided in the second node and used to, when the NORMAL message corresponding to the message ID is received within the timeout period, determine whether the hop difference exceeds a hop threshold; and a first system repair module provided in the second node and used to repair the P2P network system when the hop difference exceeds the hop threshold; and for the fault-tolerant maintenance program, the query device includes:

a second-node removing module provided in the first node and used to remove the second node from the Eager List thereof when a connection between the first node and the second node constituting edges of the P2P network system is disconnected;

a query-request initiating module provided in the first node and used to initiate a query request to first target nodes in a Passive List of the first node in sequence; the query request including an instruction to check whether the first target nodes are online and an instruction to query a size of a Lazy List of the first target node;

a query-result receiving module provided in the first node and used to receive query results returned by each first target node for the query requests, and select a second target node with a smallest Lazy List and a lowest delay from the first target nodes according to delays in the query results and the sizes of the Lazy Lists of the first target nodes; and a second system repair module provided in the first node and used to add the second target node to the Lazy List of the first node, and use nodes in the Lazy List as substitute edges to repair the P2P network system.

Compared with the prior art, the disclosure has the following advantages:

in the disclosure, an nRW random witness mechanism is employed to prevent the transaction process from being tampered, each transaction initiating node that initiates the transaction randomly selects a plurality of witness nodes to witness the transaction, and each witness node packages the transaction to generate the blocks, and then selects multiple random storage nodes to back up and store the blocks; meanwhile, the directed acyclic graph DAG structure is employed, wherein the directed acyclic graph ledger structure is matched with an nRW consensus mechanism, so that the supervision problem in the large-scale sharing and exchanging process is solved, and a voucher storage throughput of a distributed ledger according to the embodiments of the disclosure can be linearly expanded along with a number of nodes increasing.

According to the disclosure, query conditions are broadcast to the nodes in the P2P network system by maintaining the P2P network system through the tree structure with high fault tolerance and load balance; after receiving the query request, the nodes return local data satisfying the query conditions to the father nodes in the P2P network system; the father nodes perform settlement and de-duplication on the data returned by all the child nodes and the local query results; the processed results are returned to the father nodes of the nodes; and the data is returned to the root node by rounds of summarization, so that a load of a proxy node can be reduced and a low delay can be guaranteed.

According to the disclosure, aiming at an expandability problem of a query function of the distributed ledger based on graph structure random storage, a hop optimization method is employed to optimize the P2P network system through the hops transmitted in the messages to construct the P2P network system with a relatively balanced network, so that a processing operation of the query result is uniformly allocated to all the nodes in the network, and an outdegree is dynamically adjusted according to a CPU power of the node, so that a query delay is not greatly influenced on the premise of ensuring the load balance, and an expandability of the system is ensured.

Aiming at a fault tolerance problem of the query function of the distributed ledger based on graph structure random storage, a delay optimization and neighbor node management protocol method is employed, so that the query message can be received by a lower-layer node in the case that an upper-layer node is down, and a node leaving the network can be dynamically replaced by a new online node through a neighbor management protocol, thus ensuring connectedness of the whole network.

BRIEF DESCRIPTION OF THE DRAWINGS

FIG. 4 is a flow chart of steps of a query method according to the embodiment of the disclosure;

FIG. 5A is a schematic diagram of first generation of a P2P network system;

FIG. 5B is a schematic diagram of the P2P network system after first message transmission is completed;

FIG. 10B is a schematic diagram of results of multi-condition query; and

DETAILED DESCRIPTION

Figure 1:
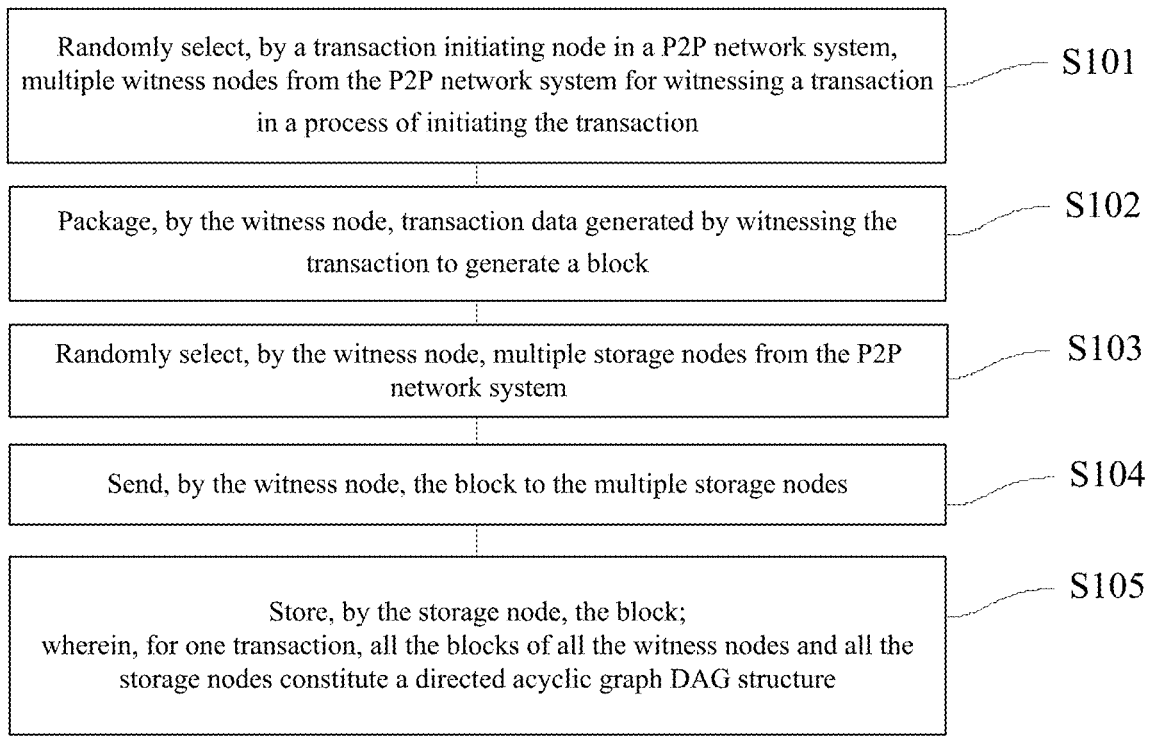
FIG. 1 is a flow chart of steps of a storage method according to an embodiment of the disclosure.

In order to make the above objects, features and advantages of the disclosure be more clearly understood, the disclosure will be described in further detail below with reference to the drawings and detailed description.

In order to solve the foregoing problems, an embodiment of the disclosure discloses a data-interoperability-oriented trusted processing method, wherein the method is applied to a P2P network system, the P2P network system includes a plurality of nodes, and the method includes a storage method and a query method.

In a traditional storage method, trusted voucher storage is often associated with a difficulty of tampering prevention. The traditional so-called tamper-proof blockchain is not guaranteed to be tamper-proof by 100%. For example, hackers stole about $50 million worth of Ether at that time (the Ether at this time was not the Ethereum at present) due to loopholes in smart contracts. At that time, Vitalik Buterin, the founder of Ethereum, adopted a strategy of hardfork to save losses of most people, and replaced the attacked chains with new long chains, so that those stole by the hackers were valueless. But at that time, some supporters of the community thought it was a decentralized community, the future of which could not be determined by one person. Therefore, these supporters were determined to resist the losses after being attacked by the hackers to ensure the decentralization of the community. Therefore, there was a contradiction in the community, and there were two chains after hardfork: Ethereum Classic (ETC) and Ethereum (ETH) today. Each chain has hashrate maintenance, so both chains are running well now. This event is actually the consensus result that Vitalik Buterin, the founder of Ethereum, modified (or can be said to have tampered with) nodes of the whole network through his own appeal, thus invalidating the hackers' attack behaviors that had already occurred. In addition, blockchains with POW consensus mechanism will have the problem of so-called 51% attack. In the white paper of Bitcoin, there is a description that is closest to the definition of 51% attack: "The system is secure as long as honest nodes collectively control more CPU power than any cooperating group of attacker nodes." In other words, the system is secure as long as honest computing nodes collectively control more CPU power than any attacker group. It can be inferred from this sentence that if someone wants to tamper with a transaction result of Bitcoin, one possible way is to control a large amount of CPU power (51%) in a Bitcoin network in a short time, and make the whole network accept this updated chain by generating more new blocks than an original number (from the block to be tampered to a case number of the current block).

Single-chain structures are mostly employed in traditional blockchains to ensure transaction legality and avoid double spend attack problem, and it is necessary to reach a consensus on a sequence between any two transactions, so the whole network nodes can only generate blocks one by one in sequence, and the speed is slow. Moreover, the whole network consensus mechanism of the traditional blockchains requires each participating node to store a full amount of data. However, the trusted voucher storage realized by this whole network consensus mechanism will encounter obvious bottlenecks in throughput and storage overhead.

First, FIG. 1 illustrates a flow chart of steps of a storage method according to an embodiment of the disclosure, wherein the method may specifically include the following steps.

In step S101, a transaction initiating node in the P2P network system randomly selects a plurality of witness nodes from the P2P network system for witnessing a transaction in a process of initiating the transaction;

in step S102, the witness node packages transaction data generated by witnessing the transaction to generate blocks;

in step S103, the witness node randomly selects a plurality of storage nodes from the P2P network system;

in step S104, the witness node sends the blocks to the plurality of storage nodes; and in step S105, the storage node stores the blocks, wherein, for one transaction, all the blocks of all the witness nodes and all the storage nodes form a directed acyclic graph DAG structure.

Nodes refer to computers in the P2P network system, including mobile phones, mining devices, servers, or the like. The transaction initiating node, the witness node and the storage node in the embodiment of the disclosure all refer to any of the above nodes.

The transaction initiating node may be a node that acquires initial data input or a node that transmits data (which may be a block) to neighbor nodes in the network. The transaction refers to a process of sending the data to a database or a target node, for example, the transaction initiating node acquires the data input of "Hello!", and then adds a target address to "Hello!", packages the data and sends the packaged data to a node corresponding to the target address, and this is a transaction process. In actual processing, the transaction may include multiple data deposits, which may also be called multiple sub-transactions, for example, "I'm Davy", "nice to meet you", and the like, may be possibly included after inputting "Hello!". The "I'm Davy" and "nice to meet you" mentioned above are a sub-transaction respectively.

In an embodiment of the disclosure, the witness node may also be regarded as a consensus node, which is used to witness the above transaction, witness data, time, initiator, target person and the like of the transaction, and then package transaction data generated by witnessing the transaction to generate blocks. Based on the above description of the sub-transactions, the generated blocks may probably include multiple sub-transactions. Therefore, in a preferred embodiment of the disclosure, in order to facilitate data transmission, a storage capacity of the blocks is set to be 1024 bytes. A concrete implementation method of the step S102 includes: packaging, by the witness node, the transaction data to generate the blocks when a data volume of the transaction data generated by witnessing the transaction exceeds 1024 bytes. Next, the witness node randomly selects a plurality of storage nodes and sends the blocks to the storage nodes for storage.

To facilitate understanding the storage process of the embodiment of the disclosure, further analysis is made as follows:

a first transaction initiating node is a node for obtaining user data input. The transaction initiating node initiates a transaction, randomly selects multiple first witness nodes to witness the process, and generates a first block, wherein the first block is randomly and dispersedly stored in a multiple first storage nodes by the witness node.

In the above process, the first witness node may be regarded as a transaction in the process of generating the first block and sending the block to each first storage node. At this time, the first witness node may be regarded as a second transaction initiating node, which is equivalent to a node that initiated the transaction at the beginning (the node that acquires the user data input). Then, the first witness node will also randomly select multiple second witness nodes to witness the process of the transaction (generating the block and sending the block to each first storage node), and generate a second block, and the second witness node randomly selects multiple second storage nodes to store the second block.

The above-mentioned steps are cycled in sequence. Therefore, for one transaction, all the blocks of all the witness nodes and all the storage nodes form a directed acyclic graph DAG structure (DAG). "Directed" refers to having a direction, which should exactly refer to the same direction, and "acyclic" means non-circular). In the DAG structure according to the disclosure, each of the blocks has a plurality of preceding blocks and a plurality of subsequent blocks. For each node (such as the second witness node), the block of the previous transaction process (such as the first block) is a preceding block of the node, while the block generated by next transaction process is a successor block (such as the second block) of the node. Each node maintains the preceding blocks and subsequent blocks thereof, forming an infinitely extensible chain structure.

Figure 2A:
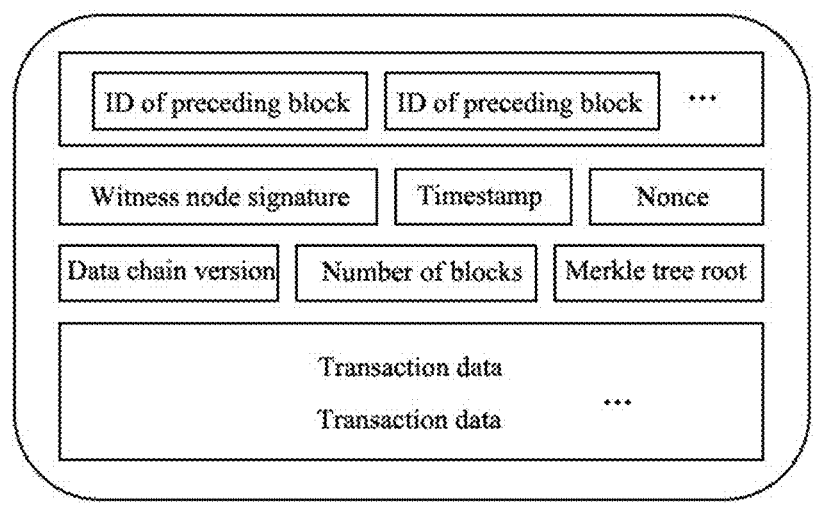
FIG. 2A is a structure diagram of data inside a block according to the embodiment of the disclosure.
Figure 2B:
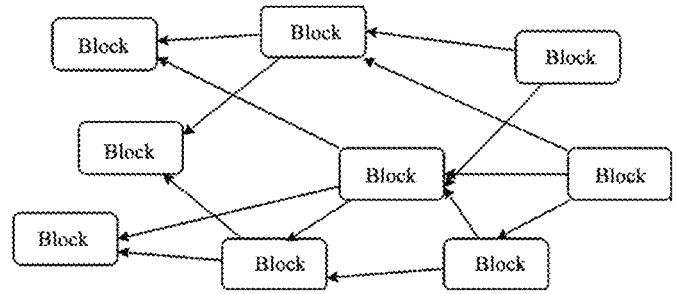
FIG. 2B is an organization structure diagram of the block according to the embodiment of the disclosure.

On the basis of the above-mentioned contents, a structure diagram of data inside the block according to the embodiment of the disclosure is as shown in FIG. 2A and FIG. 2B. The block includes a block header and a block body; wherein the block header includes IDs of the plurality of preceding blocks, a witness node signature, a timestamp, a unique identity Nonce, a data chain version, a number of blocks and a Merkle Tree root; wherein the block body includes the transaction data. Merkle Tree root stores meta-information of the transaction data, including generation time, Hash of actual data (i.e., block body), Hash value of previous block, and other information.

In this case, if a tamper wants to modify the transaction, the block for the transaction needs to be tampered. To tamper with each block, the preceding blocks of the block need to be obtained, and then a hash value of the previous block and actual data of the block thereof are used to calculate a hash value thereof, so that the block can be tampered. However, due to the exponential growth of the blocks involved in this transaction, the tamper has to find all the blocks generated for the transaction in the whole network (including the first block, the second block, a third block . . . ) and tamper with all the blocks. In terms of implementation, it is almost impossible to tamper with all the blocks, which increases the difficulty of tampering in the transaction process. FIG. 2B illustrates an organization structure diagram of the block according to the embodiment of the disclosure.

Single-chain structures are mostly employed in traditional blockchains to ensure transaction legality and avoid double spend attack problem, and it is necessary to reach a consensus on a sequence between any two transactions. Unlike Bitcoin, for the requirement of trusted voucher storage in the embodiment of the disclosure, a plurality of witness nodes are selected, and the random storage process among each witness node is independent, so there is no need to reach a consensus on the strict sequence between transactions, and there is no need to synchronize the whole network, thus ensuring the trusted storage speed of transactions of the disclosure.

Figure 3:
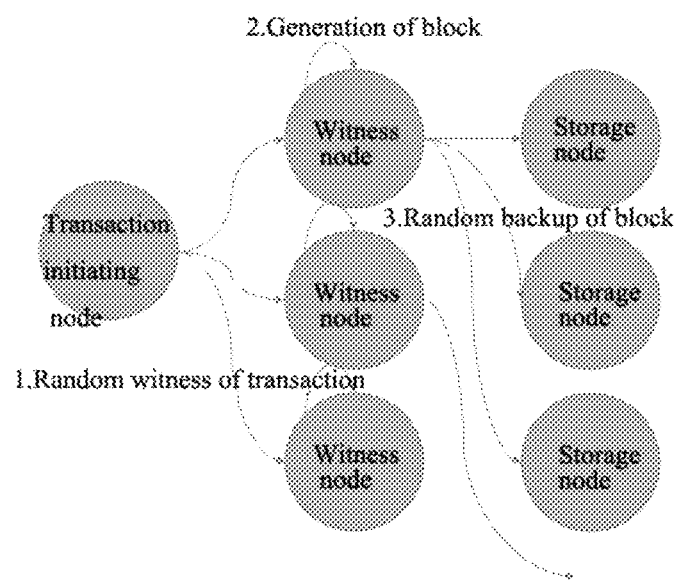
FIG. 3 is a schematic diagram of a witness-consensus process according to the embodiment of the disclosure.

In a preferred embodiment of the disclosure, for one transaction, a quantity of the witness nodes is three, and a quantity of storage nodes selected by each of the witness nodes is three. For tampering with each block of each transaction, the tamper needs to find three witness nodes for each transaction in the full text, and then find three storage nodes randomly selected for each block. The setting mode of the "Three-Three Consensus" further increases the tampering difficulty of the tamper. In addition, it is not necessary to synchronize the DAG of the whole network since each node maintains the DAG thereof, thus avoiding the problem that the number of nodes called for the transaction is too large, which affects the trusted voucher storage speed of the transaction. As the number of nodes and the voucher storage throughput increase, the storage overhead of nodes keeps increasing linearly with time, and will not be increased in an explosive way, thus reaching the balance between the storage overhead and the data reliability. FIG. 3, illustrates a schematic diagram of a witness-consensus process according to the embodiment of the disclosure.

In a preferred embodiment of the disclosure, when the witness node sends the blocks to the plurality of storage nodes, the method further includes: broadcasting, by the witness node, the block header of the block to other nodes in the network; and adding, by the node receiving the block header, the block header into a plurality of preceding blocks and a plurality of subsequent blocks corresponding to the block of the node receiving the block header. On the basis of the structure diagram of the data inside the block mentioned above, the block header includes IDs of the plurality of preceding blocks, a witness node signature, a timestamp, a unique identity Nonce, a data chain version, a number of blocks and a Merkle Tree root. The witness node adopts the mode of broadcasting the block header of each block to other nodes, which further improves the difficulty of tampering, and the tamper has to destroy a block header record of the block recorded in other nodes while modifying the block, thus increasing the voucher storage reliability of the disclosure on the transaction data.

In conclusion, the process of randomly selecting the witness nodes and randomly selecting the storage nodes in the embodiment of the disclosure is a random consensus process, and the nRW random witnesses (n-Random Witnesses) mechanism is adopted. And all the blocks of all the witness nodes and all the storage nodes form a directed acyclic graph DAG structure. Therefore, if a malicious tamper wants to tamper with this transaction, the witness nodes and the storage nodes stored randomly need to be found out first, and then all the blocks recorded with the transaction needs to be tampered. The directed acyclic graph ledger structure is matched with the nRW consensus mechanism, so that a supervision problem in a large-scale sharing and exchanging process is solved, and a voucher storage throughput of a distributed ledger according to the embodiment of the disclosure can be linearly expanded along with a number of nodes increasing.

The distributed ledger based on random storage according to the embodiment of the disclosure is constructed in the P2P network system through the storage process above, which can safely record the data of the user to the distributed network nodes. After the data is safely recorded, a reliable and efficient mechanism is still needed to retrieve data on the distributed ledger, such as querying balance, and querying transaction histories and transaction contents. Such query may be accurate query, and may possibly be fuzzy query, range query and multi-condition query. However, the query function should not only provide retrieval of the transaction data, but also provide traceability and audit functions in case of difference in the transaction data. That is, how to deal with the query request of the user, query qualified data on the distributed ledger, and respond results accurately and quickly to the user is as important as data storage.

For example, in similar architectures such as Bitcoin and Ethereum, a miner node packages transactions into a block and broadcasts the block to all nodes on the network. After receiving the newly packaged block, each node places the block into a blockchain structure maintained by itself. Each node in the whole network contains all the transaction data, so that each node can act as an agent node for the query request, and then respond to the query request by retrieving a database thereof for data that satisfies the conditions. However, since the first genesis block in 2009, Bitcoin has generated 193 GiB of data, and every full-node on the Bitcoin network needs to occupy a of disk space of 193 GiB. With the passage of time, the data volume will continue to increase. In order to increase a transaction throughput and save the disk space, a new-type distributed ledger abandons the way of data synchronization in the whole network, but employs a way of partially and randomly storing the transaction data. That is, all the nodes on the network do not store the full amount of data, but only store part of the transaction data randomly. Because the nodes on the network with this architecture do not store all the data, the query methods of Bitcoin and Ethereum cannot be applied.

Another intuitive query implementation method is to synchronize all the data on the network to an agent node of the query request. The agent node acquires data of all the nodes in the network through a certain way, verifies and summarizes the data, stores the data in a database thereof, and externally provides the query function. However, this solution is only applicable to a scenario with less number of nodes and lower TPS. When the number of nodes and the TPS reach a certain threshold, the data volume of the transaction will exceed a bandwidth and a CPU power of the agent node, which makes the query function unavailable, that is, the architecture of the query system is not extendable. A network environment and an online state of nodes are complicated and changeable, and frequent joining and leaving of nodes should not affect the use of the query function, so the query system should have certain fault tolerance.

Therefore, the query system expected to implement needs to have the following characteristics: 1) extendibility, wherein the query function should not become unavailable with the increase of the number of nodes and TPS on the network; and 2) fault tolerance, wherein frequent joining and exiting of nodes in the network should not affect the use of the query function.

In view of such an architecture that the data is randomly and redundantly stored in the P2P network, and validation of data validity is based on retrieval results of all or part of the nodes, FIG. 4 illustrates a flow chart of steps of the query method according to the embodiment of the disclosure, which may specifically include the following steps.

In step S401, in the P2P network system, a first node acquires a query request broadcast by a father node thereof, the first node being any node in the P2P network system.

In step S402, the first node broadcasts the query request to a child node thereof through a tree maintenance program; wherein the child node is used to broadcast the query request to a corresponding child node thereof by using a tree structure of the P2P network system, and the corresponding child node thereof repeats the above broadcasting step till the query request has been broadcast to all nodes on the P2P network system; each of the nodes retrieves a local database after receiving the query request, waits for a result of the child node thereof, and after data returned by all the child nodes is collected, performs settlement and de-duplication operations, and returns a result to the father node thereof; after rounds of feedback, when the root node receiving the query request of a user receives the results returned by all the child nodes, the root node performs final settlement and de-duplication operations to generate a final query result and returns the final query result to the user.

In the embodiment of the disclosure, a P2P network system of a tree structure with high fault tolerance and load balancing is proposed (the system may be possibly referred to as a tree in the following), and the P2P network system is not constructed when the protocol starts running. Instead, when the first message is transmitted, the P2P network system is formed along with a propagation path of the message, and then the tree is optimized and repaired through propagation of subsequent messages. In the query method aiming at the P2P network system, the embodiment of the disclosure employs the query request method of neighbor nodes (the neighbor nodes refer to a father node or child nodes of a certain node), and broadcasts the query request to the child nodes of the node through the tree maintenance program, and then the child nodes broadcast the query request to corresponding child nodes thereof. The above steps are repeated, and the query messages are broadcast to all the nodes on the network by using the tree structure. After receiving the query request, the node searches the local database and waits for the result of the child nodes thereof to return. In this process, an idea of "divide-and-conquer" is employed to evenly allocate de-duplication, verification and transmission of all the query results to all the nodes on the network. At first, the nodes constitute the tree structure. Each node transmits the query result to the father node thereof excluding the root node. After the father node receives all the data returned by all the child nodes, the query results are de-duplicated and verified. After rounds of feedback, when the root node receiving the query request of a user receives the results returned by all the child nodes, the root node performs final settlement and de-duplication operations to generate a final query result and returns the final query result to the user. According to the embodiment of the disclosure, the load of the agent node can be reduced and the low delay can be ensured through a divergent query method of the neighbor nodes and the de-duplication and verification of the query result in the returned transmission process; and the tree can not only be used for query result recovery, but also be used for query request transmission.

In terms of concrete implementation, the distributed ledger based on graph structure random storage according to the embodiment of the disclosure is a completely decentralized P2P application, and each node on the network cannot store the node information of the whole network, so it is necessary to define some related data structures to store the information of some nodes on the network. All the information of the nodes on the whole network is dispersed and saved to all the nodes on the network, i.e., part of the information maintained by all the nodes reflects a topological structure of the whole network. Each node can update dynamically according to a connection state between the node and the node maintained by itself, so as to ensure a connection between the node and the nodes of the whole network. The construction of the P2P network system depends on the above data structure, and the connection state and delay between the nodes are dynamically changing. According to this change, the tree structure of the P2P network system is repaired and optimized, and some additional data structures need to be defined in the repair and optimization process, such as a related data structure of cached messages, wherein the data structure can dynamically optimize and repair the P2P network system according to an arrival order of messages. How to define and use the above data structure to maintain a global tree becomes very critical. First of all, the maintenance of the tree is mainly divided into the three parts as follows:

1. construction of the tree: in an existing network topology environment, some connected edges are deleted and a spanning tree that satisfies the above conditions is constructed; and this process is run in an initialization phase of the protocol;

2. optimization of the tree: the connections between the nodes and the online state of the nodes in the network are constantly changing; the tree cannot be static, and has to be dynamically optimized with the changes of network environment, such as optimization of transmission delay, optimization of transmission hop and optimization of node outdegree; and 3. repair of the tree: when one node on the P2P network system leaves the network or one connected edge on the tree is temporarily disconnected, receiving of transmission messages by a lower node will be affected; the repair of the tree is to ensure that the P2P network system is repaired when the nodes leave and the connection is disconnected, to ensure that all the nodes can receive the broadcast messages and transmit the query results, and to repair the tree continuously in the subsequent propagation process.

In order to rapidly transmit the messages in the transmission process, the connection between the nodes employs a TCP long connection, which can not only ensure the reliable transmission of messages, avoid overheads of establishing connections every time, but also quickly detect the failure or disconnection of nodes.

In order to implement the embodiment of the disclosure, the P2P network system includes three protocols including BroadcastTree, MsgTransferProt and Partial View, wherein the BroadcastTree is used for maintaining the P2P network system; the MsgTransferProt is used for broadcasting a query message and verifying and transmitting a query result; and the PartialView is used for managing neighbor nodes of each node, and the neighbor nodes include the father node and the child node; and wherein the Active List and the Passive List are located in the PartialView protocol of the P2P network system; each node includes an Active List and a Passive List, and the Active List is divide into an Eager List and a Lazy List; wherein a quantity of nodes in the Active List is a fixed value, and nodes establishing a TCP connection with the nodes on the P2P network system are stored in the Eager List for transmitting messages; remaining nodes in the Active List excluding the Eager List are stored in the Lazy List, and are used for transmitting a message digest or message ID, and used for optimization and fault tolerance of the P2P network system; random nodes are stored in the Passive List, and are used for replacing disconnected nodes in the Active List, to ensure a connection between the nodes and a network in the P2P network system;

each node includes a first Map cache, a second Map cache and a third Map cache, wherein the first Map cache is ReceivedMsgMap, stores mapping of a message ID and a message, and is used for caching a currently received message so as to respond to requests to the message from other nodes not receiving the message;

the second Map cache is NotReceivedMsgMap, and caches mapping between a message ID and a node sending the message, and if the message sent by the node in the Eager List is not received when a specified time period is reached, triggers a Timer to request the message from the node sending the message and repair the P2P network system; and the third Map cache is TimingCacheMsgMap, and is used for caching a currently received message, and if the message sent by the node in the Lazy List is received within a specified time range, comparing hops of the two messages to determine whether to optimize the tree, thus providing a new optimization possibility for the P2P network system.

Specifically, assuming that a complete P2P network system has not yet been formed, the user sends a query message to a node 1 (the first node), and the node 1 broadcasts the query message to all the nodes in the Eager List thereof, i.e., a node 2, a node 3 and a node 6. After receiving the message, these nodes check whether the message has been received firstly, i.e., check whether the current message exists in the ReceivedMsgMap. If the current message exists in the ReceivedMsgMap, the node sending the message is moved from the Eager List to the Lazy List, and a PRUNE message is sent to the node sending the message. If the current message does not exist in the ReceivedMsgMap, the message is cached in the ReceivedMsgMap and sent to all the nodes in the Eager List. FIG. 5A illustrates a schematic diagram of first generation of the P2P network system. In FIG. 5A, dotted lines represent the nodes in Lazy List, which are used for fault tolerance; while solid lines represent edges of the P2P network system, which are used to transmit the query message. FIG. 5B illustrates the P2P network system after the first message transmission is completed, the nodes in the Eager List of some nodes are removed to the LazyList, and the connection between each node and the nodes in the Eager List thereof forms edges of the spanning tree. Subsequent messages only need to be transmitted to all the nodes in the Eager List and message IDs are sent to all the nodes in Lazy List. However, the initialization of this P2P network system is generated according to a transmission speed of a transmission path, i.e., a number of subtree nodes of nodes with fast transmission speed may be more than a number of subtree nodes of nodes with slow transmission speed, which ignores balance of the tree.

The above process maintains three important lists, i.e., the Eager List, the Lazy List and the Passive List. These three lists are the basis of running a maintenance algorithm of the P2P network system. The maintenance of these three lists directly affects the structure of the P2P network system, the query delay and the duplication and verification of the query results. The Eager List and the Lazy List are actually nodes that are in long connection with the current node, and the Passive List is a candidate list of the two lists, which aims at randomly acquiring the nodes on the network, so as to prevent partial regionalization of the network, the occurrence of multiple connection components and the inability of communication between the nodes.

In the following, the embodiment of the disclosure elaborates a specific solution on how to dynamically maintain the three lists in a complicated network environment, so as to optimize the transmission delay and calculation and strengthen the connectivity between the nodes, wherein the first node is taken as an example.

First, before the first node joins the P2P network system, three lists of the first node need to be initialized, and the method includes the following steps.

In step 1, the first node acquires part of topology information of the P2P network system and uses the topology information to initialize the Eager List, the Lazy List and the Passive List thereof.

In the embodiment of the disclosure, a node management mode based on HyparView is employed, and it is recommended to define one or several Contact Nodes in the original HyparView. When each node joins the network, the node is first connected to the contact node, and the contact node sends three lists of the node to a node to be joined. However, this will easily lead to regionalization of the network, resulting in multiple connection components, and causing the inability of all the nodes to communicate with each other. Therefore, a node joining algorithm based on KAD (Kademlia) is employed in the embodiment of the disclosure, wherein the KAD algorithm is a convergence algorithm of a distributed Hash table proposed by Petar Maymounkov and David Mazieres from New York University in 2002. In this algorithm, a degree of association between two nodes is measured by an exclusive or distance between two node IDs. By effectively layering the node IDs, each node only needs to save part of node information on the network, and only needs log(N) hops to find out corresponding resources or locate the corresponding nodes. If there are no resources and nodes that satisfy the conditions, several resources or nodes closest to the resources or nodes will be found. Based on the characteristics of KAD, the embodiment of the disclosure utilizes the KAD algorithm to initialize a neighbor node list composed of neighbor nodes maintained by the node itself.

The above-mentioned topology information includes a randomly allocated Node ID. The step 1 may specifically include the following sub-steps.

In sub-step 11, the first node initiates a request to the network of the P2P network system by using the NodeID and the KAD algorithm to find a neighbor node closest to the NodeID.

In sub-step 12, the first node selects some of the neighbor nodes to initialize the Eager List, the Lazy List and the Passive List thereof. In the embodiment of the disclosure, each node is randomly allocated with a Node ID when initiating, and sends a request to the network by using the Node ID and the KAD algorithm, so as to find several nodes closest to the Node ID. Then, the node selects some nodes from these nodes to initialize the three List lists thereof. Several nodes closest to the node are selected as the neighbor nodes each time, preferably, the nodes with lower delay are selected as the Active List, and the remaining nodes are selected as the Passive List.

In a preferred embodiment of the disclosure, the sub-step 12 includes the followings: the first node selects m nodes with the smallest outdegree of Eager List from the Eager Lists of the neighbor nodes according to an initial outdegree m of the first node, and adds the m nodes to the Eager List thereof, and randomly selects n nodes from the Passive Lists of the neighbor nodes according to a number of nodes n in the Passive List thereof, and adds the n nodes to the Passive List thereof, and initializes the Lazy List to be empty at the same time, so as to complete the initialization of the three List lists thereof. Further, when the m nodes satisfying the conditions cannot be found from the Eager Lists of the neighbor nodes, the first node selects d nodes with the lowest delay from the Passive Lists of the neighbor nodes returned, and adds these d nodes to the Eager List thereof, thereby ensuring that the Eager List and the Passive List of the node can be initialized to Lists with a specified size. The Lazy List is initialized to be empty, and the nodes in the Eager List will be transferred to the Lazy List in the subsequent tree construction and optimization processes.

In step 2, after the Eager List, the Lazy List and the Passive List are completely initialized, the first node respectively establishes a TCP long connection with the nodes in the Eager List thereof to form an edge of the P2P network system.

In step 3, the first node repairs the P2P network system by using the nodes in the Lazy List as substitute edges, wherein merely one edge with a relatively fast transmission speed and a least quantity of hops is preserved, and the remaining nodes are finally removed to the Lazy List.

Through the series of operations above, the joined nodes finally serve as leaf nodes of the P2P network system, and participate in message transmission and result summarization.

The tree maintenance program includes an extensible maintenance program and a fault-tolerant maintenance program.

Figure 6:
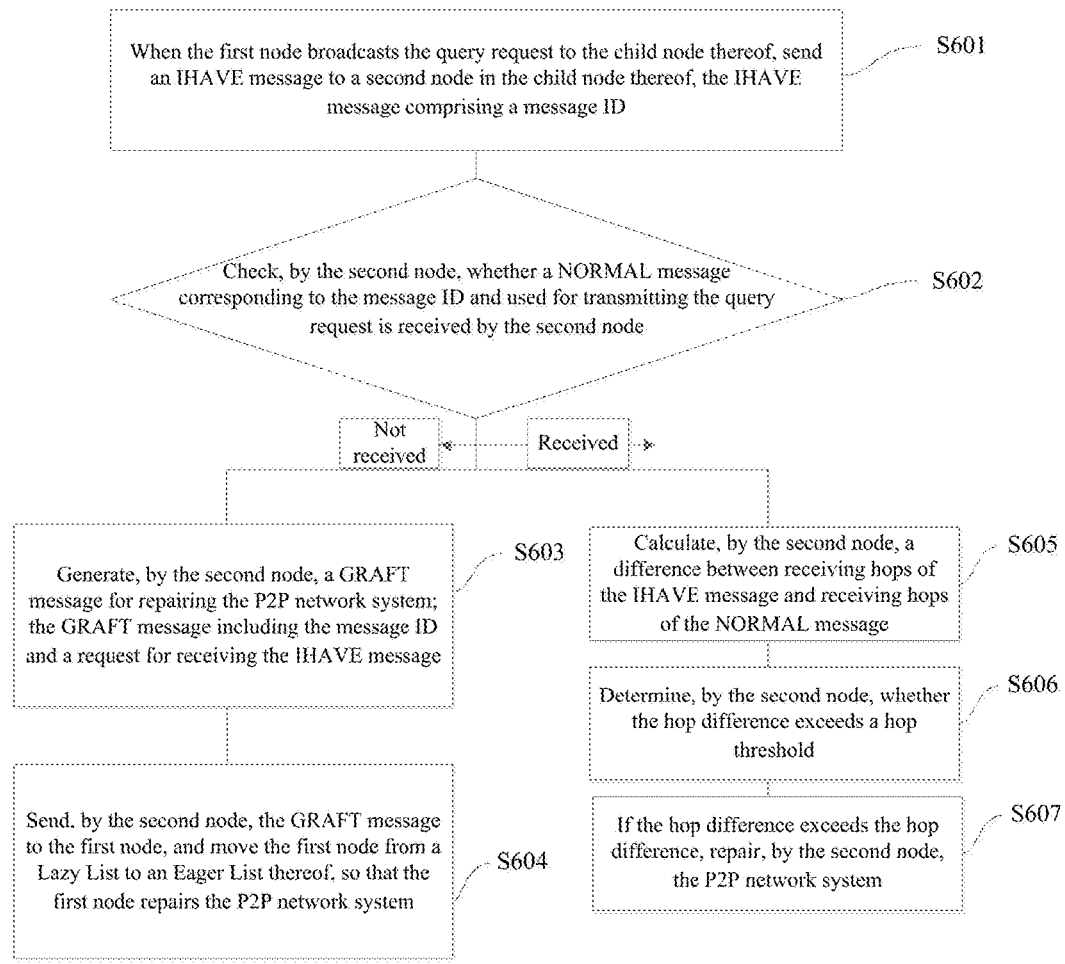
FIG. 6 is a flow chart of steps of an extensible maintenance program according to the embodiment of the disclosure.

On the basis of the above contents, and in view of the extensible maintenance program, FIG. 6 illustrates a flow chart of steps of the extensible maintenance program according to the embodiment of the disclosure, wherein the query method may specifically include the following steps.

In step S601, when the first node broadcasts the query request to the child node thereof, the first node sends an IHAVE message to a second node in the child node thereof, the IHAVE message including a message ID.

In step S602, the second node checks whether a NORMAL message corresponding to the message ID and used for transmitting the query request is received by the second node.

If the second node does not receive the NORMAL message corresponding to the message ID within a timeout period, the following steps are performed.

In step S603, the second node generates a GRAFT message for repairing the P2P network system; the GRAFT message including the message ID and a request for receiving the IHAVE message.

In step S604, the second node sends the GRAFT message to the first node, and moves the first node from a Lazy List to an Eager List thereof, so that the first node repairs the P2P network system.

If the second node receives the NORMAL message corresponding to the message ID within the timeout period, the following steps are performed.

In step S605, the second node calculates a difference between receiving hops of the IHAVE message and receiving hops of the NORMAL message.

In step S606, the second node determines whether the hop difference exceeds a hop threshold.

In step S607, if the hop difference exceeds the hop difference, the second node repairs the P2P network system.

In the embodiment of the disclosure, a function of the NORMAL message is the query message or query result transmitted in the P2P network system, which is sent through the TCP long connection established with the nodes in the Eager List. The IHAVE message contains a message ID of the message that is already received by the node at current, and is sent through the TCP long connection established with the node in the Lazy List, informing that the message corresponding to the message ID may be acquired from the node. The GRAFT message is a repair message of the P2P network system, which is used to request a message that has not been received from the node sending the IHAVE message, and replace the edge of the Lazy List with the Eager List to repair the P2P network system. The PRUNE message is used to cut out redundant edges on the P2P network system to prevent broadcast storm.

The setting method in case of timeout above includes the following steps: when receiving a message, the second node checks whether the IHAVE message or the NORMAL message is received through the ReceivedMsgMap; if the IHAVE message or the NORMAL message is received, the message is discarded; if the IHAVE message or the NORMAL message is not received, checks whether an ID of the IHAVE message or an ID of the NORMAL message is received; if the ID of the IHAVE message or the ID of the NORMAL message is not received, discards the message; otherwise, adds the ID of the IHAVE message or the ID of the NORMAL message into the NotReceivedMsgMap, and sets the IHAVE message or the NORMAL message as a timeout event. Therefore, the second node can determine whether the IHAVE message sent by the first node among the neighbor nodes thereof is received within the timeout period by determining a timeout event of the Timer. The timeout determining time may be set as 0.1 S.

In the steps S603 to S604, if the second node does not receive the NORMAL message corresponding to the message ID for transmitting the query request within the timeout period, which means that a father node thereof (the first node) may not be online or the delay is too high, then the GRAFT message is sent to the first node which sends the message ID. There are two objectives, wherein one is to request the unreceived message from the first node, and the other is to move the first node from the Lazy List to the Eager List to repair the P2P network system.

During concrete implementation, the query request may not be sent in the first process due to network reasons, while the second node sends the request for receiving the IHAVE message to the first node again at this time, which may cause the first node to send the query message to the second node for several times. To avoid multiple message repetitions from occupying a node memory and affecting the balance of the tree, the embodiment of the disclosure also provides a method: when the second node receives the query message, the second node checks whether the query message exists in the ReceivedMsgMap thereof; when the query message exists in the ReceivedMsgMap, the second node moves the first node sending the query message from the Eager List to the Lazy List thereof, and sends a deletion PRUNE message to the first node; when the query message does not exist in the ReceivedMsgMap, the second node caches the query message in the ReceivedMsgMap and sends the query message to all the nodes in the Eager List thereof; and when the first node receives the PRUNE message sent by the second node, the first node deletes the second node from the Eager List thereof, and puts the second node into the Lazy List thereof.

In the steps S605 to S607, if the second node receives the message within the timeout period, it means that the delay from the father node (the first node) of the second node to the second node is a little bit higher, so it is necessary to compare a hop difference between the two. Only when Lazy's hop count is smaller than Eager's hop count to a certain threshold, the tree may be repaired only when the hop of Lazy is smaller than the hop of Eager to a certain threshold. In this way, the stability and balance of the tree can be ensured, and the structure of the tree will not change constantly due to frequent network changes, thus maintaining the stability of the tree. Moreover, the tree will not be optimized only according to the transmission delay without considering the hop, thus maintaining the balance of the tree. When receiving the NORMAL message sent by the first node, the second node deletes records of the NORMAL message in the NotReceivedMsgMap and stores the NORMAL message in the ReceivedMsgMap, so as to ensure the accuracy of the data in time and maintain the balance of the tree in a later period.

Figure 7:
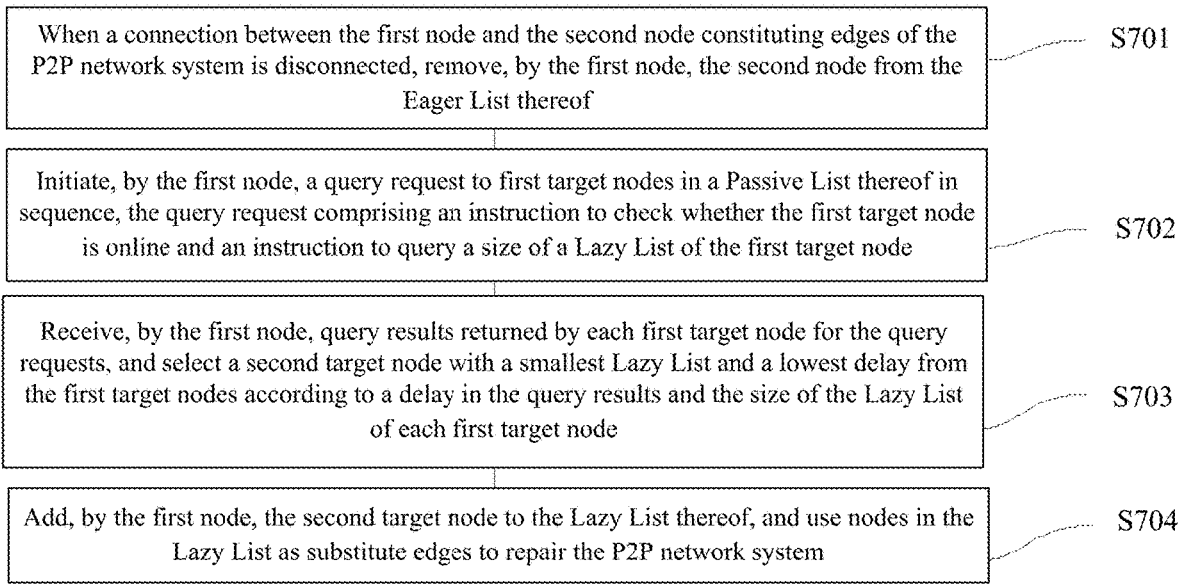
FIG. 7 is a flow chart of steps of a fault-tolerant maintenance program according to the embodiment of the disclosure.

On the basis of the above contents, and in view of the fault-tolerant maintenance program, FIG. 7 illustrates a flow chart of steps of the fault-tolerant maintenance program according to the embodiment of the disclosure, wherein the query method may include the following steps.

In step S701, when a connection between the first node and the second node constituting edges of the P2P network system is disconnected, the first node removes the second node from the Eager List thereof.

In step S702, the first node initiates a query request to first target nodes in the Passive List thereof in sequence; the query request including an instruction to check whether the first target nodes are online and an instruction to query a size of a Lazy List of the first target node.

In step S703, the first node receives query results returned by each first target node for the query requests, and selects a second target node with a smallest Lazy List and a lowest delay from the first target nodes according to delays in the query results and the sizes of the Lazy Lists of the first target nodes.

In step S704, the first node adds the second target node to the Lazy List thereof, and use nodes in the Lazy List as substitute edges to repair the P2P network system.

In the embodiment of the disclosure, the first node establishes a TCP long connection with the nodes in the Eager List maintained by the first node to form an edge of the P2P network system, and establishes a TCP long connection with the nodes in the Lazy List maintained by the first node to constitute a substitute edge of the P2P network system. When the connection on the P2P network system is disconnected or the nodes are not online, next message broadcast will be automatically repaired by the nodes in the Lazy List. To ensure the balance between the nodes in the Active List and the nodes in the Passive List, it is necessary to select corresponding nodes from the Passive List to replace the nodes in the Active List, thus ensuring the connectedness of the whole tree and increasing a fault tolerance rate.

For the steps S701 to S704, it is firstly assumed that the first node and the second node maintain a TCP long connection and respectively form an edge of the P2P network system in the Eager List of the other party. When the connection between the first node and the second is disconnected, the first node removes the second node from the Eager List of the first node firstly. At this time, the Active List of the first node is missing one element, so it is necessary to select a node from the Passive List to replace the current node. The first node initiates a query request with the nodes in the Passive List thereof in sequence. The query request has two objectives, wherein one is to check whether the current node is online, and the other is to query a size of a Lazy List of the node. Finally, the latest access time of each node is updated, and a node is comprehensively selected based on the delay and the size of the Lazy List of the node. A small size of a Lazy List of a node means that the node has a small number of layers in the P2P network system. Grafting the node with the small size of the Lazy List to the node and selecting a node with lower delay can provide more possibilities for tree optimization. Therefore, a Passive List node selection strategy is to select the Lazy List with a smaller size, and when there are a plurality of nodes in the smallest Lazy List, the one with the lowest delay is selected. In the original HyparView, the nodes in the Passive List are replaced with the nodes in the original Eager List, and join operations with different priorities are sent to the nodes in the Passive List according to a size of a current Eager List of the first node. A strategy that the Eager List and the Lazy List have fixed sizes is employed in the original HyparView, which makes the repair indispensable. However, because a strategy of keeping a sum of the sizes of the Eager List and the Lazy List unchanged herein, a number of nodes in the Lazy List of the first node is k−1 (k is an outdegree parameter configured when the node joins the network) even if the current Eager List of the first node only contains one node, and the disconnected edge will be repaired by the nodes in the Lazy List eventually even if the current Eager List is disconnected. The manner employed in the original HyparView greatly increases the maintenance cost and maintenance complexity, and is not suitable for the present scenario of the embodiment of the disclosure. Therefore, in the embodiment of the disclosure, only the nodes in the Lazy List need to be replaced. It is only necessary to wait for the following rounds of lazy repair even if the unique connection is disconnected.

The steps S701 to S704 mainly provide a solution for maintaining the Eager List and the Lazy List. In the following a solution for maintaining the Passive List is provided in another optional embodiment of the disclosure. A function of the Passive List is actually to provide node candidates for the Active List, and each node uses the Passive List to ensure that online nodes on the whole network are connected. If a poor maintenance algorithm of the Passive List may lead to multiple connection components in the network, and each node may only initiate a connection request with some nodes in the network, which leads to that all the nodes on the whole network cannot receive the query message. Disconnected nodes are constantly added to the Passive List, while nodes with lower delay and smaller size of the Lazy List are constantly removed from the Passive List and added to the Lazy List, which only results in that available online nodes in the Passive List are fewer and fewer. Therefore, it is necessary to employ corresponding strategies to update the Passive List accordingly. The whole updating process follows the idea proposed in the original HyparView, i.e., randomized updating. However, the update strategy employed is quite different from the original one, wherein a low-cost and lazy-update strategy is employed, which is more suitable for the maintenance scenario of the embodiment of the disclosure. The nodes in the Passive List of each node are randomly stored online nodes on the current network. In the original HyparView, the nodes send Shuffle messages with random hop (TTL) through the Eager List at regular intervals, and the nodes receiving the messages and the nodes sending the messages perform Shuffle operations on the nodes in the Passive List, thus ensuring that the random nodes on the whole network are maintained in the Passive List of each node. As all the nodes have to perform the Shuffle operations at fixed intervals, the load on the network is increased. To reduce this load, a Lazy Load mode is also employed in the embodiment of the disclosure to randomly acquire the nodes on the network. An updating operation will be initiated only when a number of the online nodes in the Passive List is less than a certain threshold.

In the embodiment of the disclosure, the updating operation may include the following steps.

The first node generates a fixed hop TTL when number of the online nodes in the Passive List in the first node is less than the preset threshold.

The first node sends a message carrying the TTL to a random third target node in the Eager List thereof. After receiving the message, the third target node sends node IDs in a latest Passive List thereof to the first node and subtracts 1 from the TTL, then randomly sends the TTL to random nodes in an Eager List of the third target node, and repeats the above steps till the TTL is 0.

The first node summarizes all the received node IDs, randomly selects M nodes from all the received nodes, and adds the M nodes to the Passive List, wherein M is equal to a maximum quantity of nodes capable of being stored in the Passive List minus a quantity of nodes currently stored in the Passive List.

Moreover, in order to further ensure a number of available online nodes in the Passive List, an optional embodiment of the disclosure also provides the following step: after the first node removes the second node from the Eager List thereof, the first node adds the second node to the Passive List thereof. In this way, the number of nodes in the Passive List can be further increased.

In conclusion, in the embodiment of the disclosure, the Eager List, the Lazy List and the Passive List are maintained, and the connection between the nodes on the whole P2P network system is ensured by maintaining the Eager List, thereby ensuring message transmission. The Passive List is maintained by random sampling to provide supports for updating the Eager List and the Lazy List, which can complete the initialization, repair and optimization algorithms of the P2P network system. The maintenance quality of the List will affect the stability, transmission delay and fault tolerance rate of the spanning tree. In the embodiment of the disclosure, the tree is repaired and optimized by exchanging variables in the data structures of the Active List and the Passive List. For example, the disconnected nodes are put into the Passive List, the nodes in the Lazy List with low delay and few hops are replaced by the nodes in the Eager List, and the online nodes in the Passive List are replaced by the disconnected nodes in the Active List. For example, the nodes in the Eager List are replaced by the nodes in the Lazy List according to the message receiving delay and hops, which leads to an Eager List of a top-layer node of the P2P network system being as full as possible, making maximum use of the outdegree of the nodes and reducing a height of the whole tree. Underlying nodes have enough Lazy List for optimization and fault tolerance. The Eager List of the node is randomly acquired by a KAD algorithm, while the Lazy List is eliminated from the Eager List, which is also random. A Lazy List of a lower-layer node randomly stores the nodes on the whole tree, which increases the fault tolerance of the whole tree. A situation that the lower-layer node cannot receive the broadcast message due to edge fracture of the upper layer will not occur. Because the control message is light and the tree is optimized and repaired by Lazy Repair, the optimization and repair process will not occupy a large amount of network bandwidth, and the whole maintenance process is low-load.

A role of the Lazy List and a role in the original HyparView are different due to a design particularity of the solution of the embodiment of the disclosure. In the embodiment of the disclosure, only the total size of the Lazy List and the Eager List is limited to be a fixed value, but unlike the original HyparView, the size of the Lazy List is not limited; therefore, the Lazy List is only a candidate of the Eager List. The Eager List is a node of the Lazy List used on the P2P network system, and it is not required to introduce a separate list maintenance mechanism to maintain the Lazy List. Based on the design solution different from the original HyparView, a size of a Lazy List of a node in a lower layer in the P2P network system is nearly zero. However, a size of a Lazy List of a node in an upper layer in the P2P network system is relatively larger. The TCP long connection established between the nodes is fully used to transmit messages, and the outdegree of the node is as large as possible, which reduces the height of the P2P network system and ensures a low transmission delay. However, the node in the upper layer in the P2P network system has enough Lazy List to point to other nodes in the P2P network system, ensuring the fault tolerance of the tree. The fault tolerance of the solution provided by the embodiment of the disclosure is less than that of the HyparView, ensuring ensure that a percentage ratio of failed nodes will not exceed 30%.

It should be noted that, in various embodiments of the disclosure, the first and the second are only for distinguishing different nodes, and have no substantial sequential significances.

In the following, analysis is made to the overall solution of the embodiment of the disclosure is analyzed according to the steps provided by the embodiment of the disclosure, including analysis of the storage process and analysis of the query process.

I. Analysis of the Storage Process:

In the embodiment of the disclosure, synchronization overhead between the nodes increases linearly with the increase of transactions, and has nothing to do with the number of nodes. Network overhead of each transaction is n*m (n is the number of witness nodes selected for this transaction, and m is the number of storage nodes selected for this transaction). Storage overhead of each transaction is also n*m (n is the number of witness nodes selected for this transaction, and m is the number of storage nodes selected for this transaction). Therefore, with the number of nodes increasing, a storage capacity and a network bandwidth thereof increase, and the voucher storage of the whole system can be expanded horizontally. However, for the traditional whole-network synchronized blockchain system with chain structure, storage overhead thereof depends on a number of nodes K. Therefore, with the number of nodes increasing, the storage overhead increases synchronously with the storage capacity increasing, which leads to the overall overhead increasing and the throughput decreasing with the number of nodes increasing.

Therefore, to modify certain transaction data (t), the following related nodes and blocks need to be modified:

1. A set of blocks where the transaction data locate: it is set that A={a|a is block, and a includes transaction t}, then card(A)=n.

2. A set of subsequent blocks of the block where the transaction data locate: for any block a1, a set of subsequent blocks thereof is B1={b|b is the subsequent block of a1}, then a set of all the subsequent blocks to be modified is UBi, wherein i=1, 2, . . . n.

Figure 8:
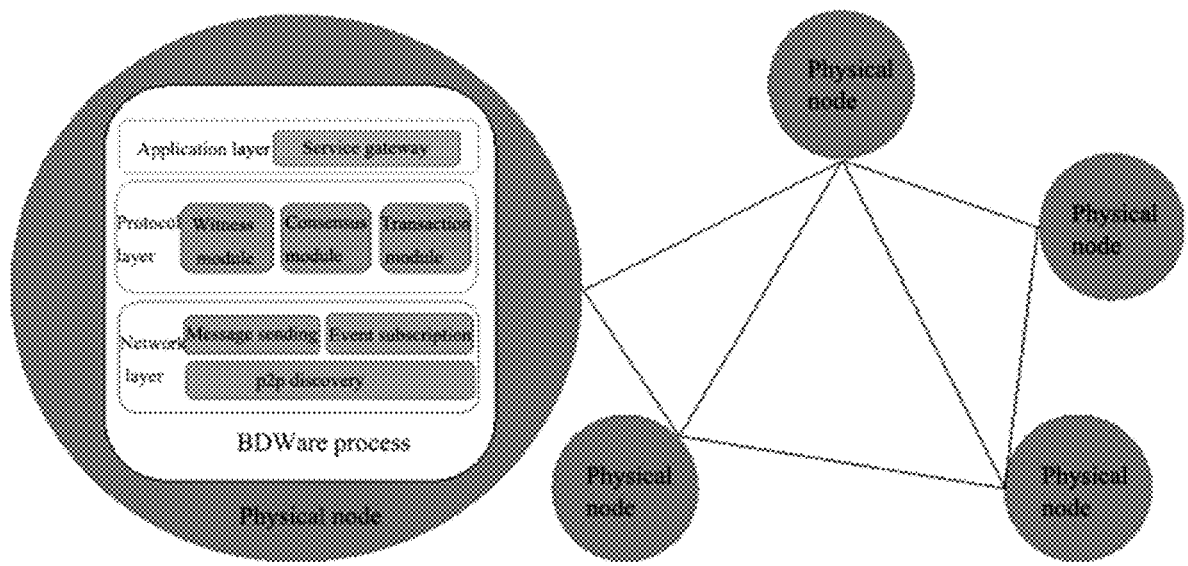
FIG. 8 is a topological structure diagram of a schematic distributed ledger system.

The number of blocks is estimated hereinafter: for a certain block, with the increase of time, a number of subsequent blocks thereof also increase. In the traditional blockchain system with chain structure, for any transaction, a tampering cost required to modify the transaction is a number k of blocks and subsequent blocks of the transaction. In the graph structure blockchain of the embodiment of the disclosure, there is always time T for any given tampering cost k (indicating the number of blocks to be tampered with), so that card(AU(UBi))>k. This shows that an anti-tampering ability of the graph structure blockchain proposed in the embodiment of the disclosure is equivalent to that of the chain structure, but the time spent is less, the speed is faster, and the throughput is larger. Libp2p is a modular network stack, which makes it easy for developers to build large and robust P2P networks by combining various transport and P2P protocols. Based on libP2P, the embodiment of the disclosure implements an example of a distributed schematic ledger. FIG. 8 illustrates a topological structure diagram of a schematic distributed ledger system, and a process according to an embodiment of the disclosure runs on each physical node, specifically including: a network layer logic provided with a p2p discovery module, which can discover other nodes joining the network; a message sending module capable of implementing message communications between nodes; an event subscription module capable of implementing event subscription between nodes; a protocol layer provided with a witness module and a consensus module implementing a witness process and a consensus process, and also provided with a transaction module providing support to an application layer; and an application layer externally providing accounting (voucher storage) service in the form of service gateway.

An execution flow of the system is described hereinafter: a caller will initiate a voucher storage request through a GRPC (GRPC is an open-source high-performance, cross-language RPC framework of google) of the service gateway based on a HTTP2 protocol, protobuf 3.x and Netty4.x+. In fact, there is no big difference between GRPC and thrift, avro-rpc in general principle. In short, GRPC does not have many breakthrough innovations). An interface transmits contents needing voucher storage to a certain node. In the transaction module, relevant meta-information, such as initiator, receiver, sending time, verification code, etc., is packaged into a transaction record and handed over to the witness module for witness. The witness process is as described above, wherein a plurality of nodes are randomly selected to synchronize the transaction record. When the transactions are collected to a certain level (such as 1024 transactions), a consensus process of packaging to generate and distribute blocks will be carried out.

The witness process and the consensus process can be implemented by using both a message sending mechanism and an event subscription mechanism. Examples of these two implementations are given below. When being implemented by using the message sending mechanism, the process is simple. It is only necessary to find out all the nodes through p2p. A random algorithm is used for a certain witness or consensus process, and a plurality of nodes may be selected from all the nodes for witness or consensus. When being implemented by using the event subscription mechanism, randomness of the witness process and the consensus process will be weakened. Before initiating a transaction, events may be subscribed with a regular policy, for example, the events are subscribed once every five minutes. Specifically, two events may be defined, including a consensus event and a witness event. Taking the witness event as an example, for any node A, the following process will be executed every five minutes: 1. randomly select a plurality of nodes and send a subscription request to these nodes; and 2. after receiving the subscription request, these nodes actively subscribe to the node A as the "witness event".

Whenever the witness process is triggered, the node issues the witness event (the event contains transaction contents), and the message (event) may be synchronized to these randomly selected nodes.

Another regular strategy based on the event subscription mechanism is that subscribers randomly generate a plurality of nodes and subscribe to witness events and consensus events of these nodes. In the subscription process, an average traffic of this method is 50% less than that of the first one. However, a number of event subscriptions for each node is a number of fixed nodes with a variance of 0. However, there is a certain variance in this method, and the variance depends on a random algorithm of the subscribed. In specific implementation, this strategy may be adopted to improve performances of the whole system if there is no need for anti-malicious nodes, but only anti-failure nodes.

II Analysis of the Query Process:

(1) Time complexity of query: in the query process, the query message needs to be broadcast to the whole network through the P2P network system firstly, and then verified and counted layer by layer through the nodes of the whole network, and finally a query result is returned to the root node of the P2P network system. If a processing procedure of the query result on the node is ignored, then the whole query process is a process of traversing the tree twice; therefore, the query delay is related to a longest path on the P2P network system. Assuming that each node is configured with a same outdegree k, each layer has an outdegree of k with a probability of pi(0<pi<1), a number of all the nodes in the tree is N, and a height of the tree is h, then $\Sigma_{i=1}^{h} (p_i * k)^i = N$, and the height of the tree is that h=O(log kN) through calculation. Only log kN hops are needed to traverse all the nodes on the whole network and summarize the query results returned by all the nodes; therefore, the time complexity of query is O(log kN).

(2) Load reduction rate; a data de-duplication rate is defined as a difference between a total amount of data actually received by the root node and a total amount of data received without employing this architecture divided by the total amount of data received without employing this architecture. Assuming that a number of transactions satisfying the query condition is n and an amount of transaction data actually received by the root node of the P2P network system is m, then the data de-duplication rate is 1−m/(12*n).

If this query architecture is not employed, a data volume that shall be received by the query agent node is 12 times the number of all the transactions that satisfy the conditions. In the transmission process of the spanning tree, the returned results will be duplicated by intermediate transmission nodes, thus reducing a total amount of data processed at the root node of the P2P network system. Assuming that the outdegree of each node is k, and all the data are evenly distributed on the whole network, then the query data satisfying the corresponding conditions should be evenly distributed among all the child nodes of the root node of the P2P network system, and a data volume finally returned should be k*n; therefore, the query de-duplication rate is 1−k/12.

On the whole, the data de-duplication rate is negatively correlated with the outdegree k of the node, while the query hop, i.e., the query delay, is positively correlated with k. That is, the larger k is, the larger the data volume received by the root node is, the greater the data processing load is, but the lower the query delay is. Therefore, it should be considered comprehensively according to different scenarios. When a CPU power of the query node is weak, the load of the root node can be reduced by using a low outdegree and losing the query delay. When the CPU power of the node is higher and a higher query delay is required, the query delay can be reduced by using a high outdegree, thus occupying partial CPU power of the root node.

(3) Analysis of extendibility:

Extendibility is an important attribute of programs, systems and networks. Extensible programs, systems and networks can gracefully handle a problem of increased workload at a very small cost, such as by increasing processing resources. For a centralized service architecture such as a search engine, the search engine has to be extensible to handle query requests of more users and establish correct indexes for more resources. The centralized service architecture usually employs a way of horizontal expansion to increase a processing capacity of the whole system by adding servers. However, the extendibility of the network is different from that of a centralized server. For example, an extendibility of a routing protocol is used to cope with changes of a network scale. Assuming that a number of nodes in the network is N and a size of a routing protocol table is O(log N), the routing protocol can be considered as extensible. For example, an early P2P application Gnutella has an inextensible problem, so other nodes can only be found by a way of flood broadcast. The appearance of a distributed hash table solves the inextensible problem of the routing protocol. A pure P2P system has no centralized structure, so the pure P2P system can be expanded indefinitely without any other resources except nodes. In the analysis of the time complexity, it is found that one query only needs log(n) hops, so the protocol may be considered as extensible at the P2P network level. In addition to message routing, there are still transmission and processing of query results. In the analysis of the load reduction rate, it is analyzed that the load of the node is negatively correlated with the outdegree k of the node in the solution of the embodiment of the disclosure. Therefore, the processing load of the node may be dynamically reduced and increased by adjusting the outdegree of the node. Nodes with higher CPU power may be given higher outdegree and nodes with lower CPU power may be given lower outdegree, so that the extendibility of the query system is further increased. In addition to the extendibility mentioned above, the solution provided by the embodiment of the disclosure also has strong functional extendibility, which provides a good foundation for further realizing a query system with more powerful functions such as stronger extendibility and less overhead in the future.

(4) Analysis of fault tolerance: realization of a fault tolerant function depends entirely on the selection and replacement of neighbor nodes. When a node in the network leaves the network and a node detects that a neighbor node thereof leaves the network, the node first removes the node leaving the network from the neighbor node thereof and selects a new neighbor node through a neighbor node selection strategy. An idea of randomization is employed for selecting the new neighbor node. Firstly, hops of a request message are randomized; secondly, neighbor nodes transmitting the request message are randomized; and thirdly, results returned from the Passive list are randomized. Although it is difficult to estimate a specific fault tolerance rate here, connectedness between the nodes can be better ensured and isolated nodes are avoided through this randomization and timely replacement method. A fault tolerance rate in the original HyparView can reach 80%, but overhead of maintaining this structure is large, and it is not necessary for a distributed ledger application to sacrifice a lot of bandwidth and CPU power to ensure such a high fault tolerance rate.

In order to verify an experimental effect of the embodiment of the disclosure, the following examples verify an availability of a query operation of the solution of the embodiment of the disclosure on a real machine and an extendibility of 10,000 nodes in a simulation environment. Verification indexes include an average hop, an average maximum hop and the data de-duplication rate of the query operation. Experimental results show that the solution is extensible, and the query delay is also within log(N) hops. The solution also has good fault tolerance, and a correct query result with a low number of hops can be still returned even if a failure rate of nodes is 30%.

Setting of experimental reference variables mainly refers to evaluation indexes of the P2P network protocol, such as the number of nodes and the failure rate of nodes. Due to the particularity of the solution, the outdegree of nodes is also selected as a reference variable. During extendibility verification in the P2P network, an availability of functions is usually verified by increasing the number of nodes. Therefore, the number of nodes is used as a reference variable to verify the extendibility of the query system. Verifying the availability of the query function by the failure rate of nodes can verify the fault tolerance of the query system. Taking the outdegree of nodes as a reference variable can verify influences of the outdegree of nodes on the load and transmission delay of the nodes, so as to better optimize parameters and improve the extendibility of the system.

The observed indexes mainly include the load of nodes, the query delay and the balance of the tree, which respectively correspond to three dependent variables including the data de-duplication rate, hops of one query and hop distribution from a leaf node to a root node. The load of nodes is characterized by the data de-duplication rate. The greater the data de-duplication rate is, the smaller the load of nodes is, and vice versa. By observing the load of nodes, the outdegree of nodes can be preferably adjusted, thus maintaining the balance between the query delay and the load. Due to a heterogeneity of the P2P network, the delay between the nodes is different in different network environments. In order to better characterize the query delay, the hop index of query instead of the query time is used herein. The balance of the tree is the key to ensure the load balance. By maintaining a balanced tree, each node can load the processing and transmission of the query results evenly. The balance of the tree is characterized by the hop distribution from the leaf node to the root node. If the hop from the leaf node to the root node is concentrated in log(N), then the tree is balanced.

(I) Analysis of Influence of Numbers of Nodes on Performances

Figure 9A:
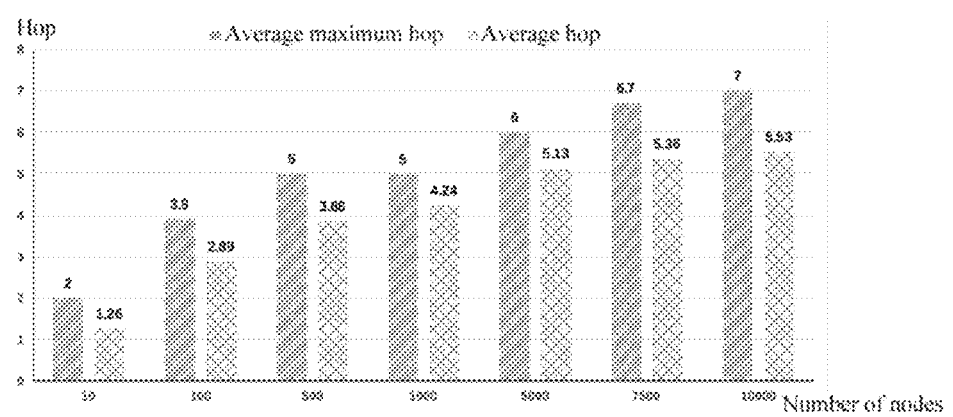
FIG. 9A is a structure diagram of a number of nodes and hops according to the embodiment of the disclosure.
Figure 9B:
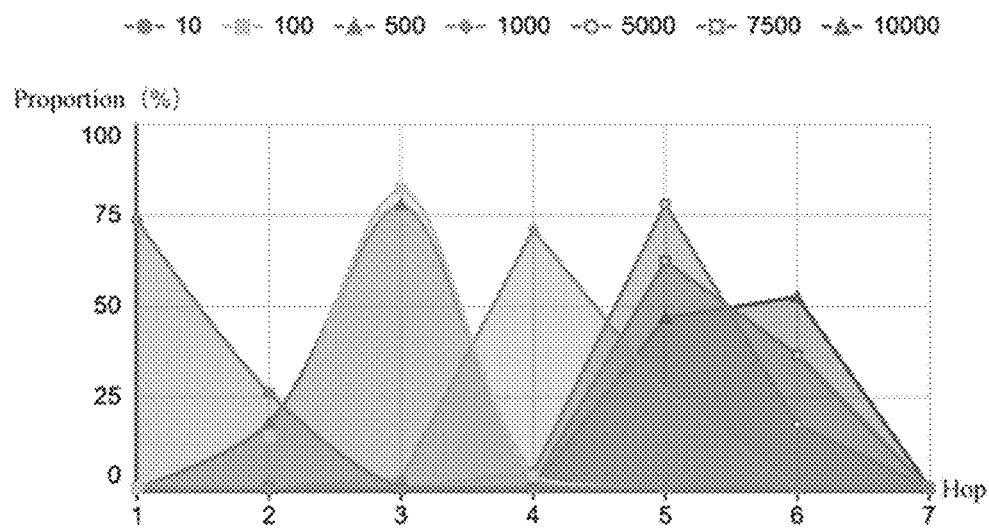
FIG. 9B is a structure diagram of hop distribution according to the embodiment of the disclosure.
Figure 9C:
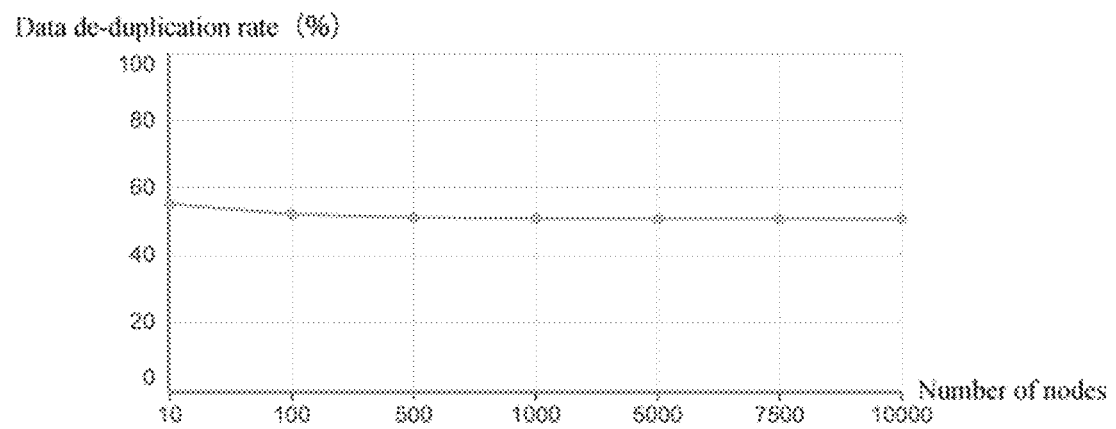
FIG. 9C is a structure diagram of a number of nodes and a de-duplication rate according to the embodiment of the disclosure.

FIG. 9A shows a maximum average hop and an average hop of the leaf node in the P2P network system with the number of nodes increasing in the case that the size of the Active List of each node is 7. It can be seen that when the average hop is in an order of magnitudes of log 7(N), the maximum average hop is slightly larger than the average hop by one to two hops due to the randomness of the topology structure of the network. This proves that the P2P network system makes full use of the outdegree of each node and fully reduces the height of the tree of the P2P network system. FIG. 9B shows a path length from the leaf node to the root node in the P2P network system with different number of nodes. If the number of nodes is 10000, the path length mainly concentrates on 5 hops and 6 hops. This proves that the tree is relatively balanced, and the balance of the tree directly determines whether the returned result information can be evenly loaded when counting the query results. In conclusion, it is verified that the maintenance solution of the P2P network system in this solution really makes full use of the outdegree of each node and constructs a balanced tree with a small maximum hop, thus ensuring the query delay and evenly loading the received query results. FIG. 9C shows that the data de-duplication rate of the root node in the P2P network system does not change obviously with the number of nodes increasing, and fluctuates around 51% in the case that the size of the Active List of each node is 7. This also indirectly proves that the data de-duplication rate has nothing to do with the number of nodes, but is only related to the outdegree of nodes in the P2P network system. Through the above experiments, it is verified that the query delay (measured by hops in the experiment) increases exponentially when the number of nodes increases, which ensures the low delay characteristic of the query function when the number of nodes increases. The balance of the P2P network system can be verified by the hop distribution from the leaf node to the root node, which proves that the solution is load-balanced in receiving the query requests and processing the query results, so the query function is still available on the premise of increasing the number of nodes, which proves the extendibility of the solution.

(II) Analysis of Influence of Failure Rate on Performances

In order to increase the fault tolerance of the whole system, the Passive List and the Lazy List are introduced in the design solution to respectively replace the Active List and the Eager List, which not only optimize the structure of the P2P network system, but also increase the fault tolerance of the P2P network system. The results below show distribution of the average maximum hop and the average hop as well as hops of all the leaf nodes on 10,000 nodes, in the case that the size of the outdegree K is 7 and the failure rate ranges from 0% to 30%.

In this experiment, 50 query messages were initiated, and some nodes are randomly exited at the beginning of each message broadcast. Therefore, the statistical results are the average maximum hop and the average hop in the repair process of the P2P network system, instead of exiting the nodes with corresponding failure rate at one time when the request broadcast is initiated. Because the structure of the tree may be completely stable after several previous repairs by using this manner, the final experimental results are too ideal and not close to reality. Therefore, evaluation indexes are evaluated by the hops in the repair process, instead of the stable hops, so that the experimental results can be as close as possible to the real network environment.

Figure 9D:
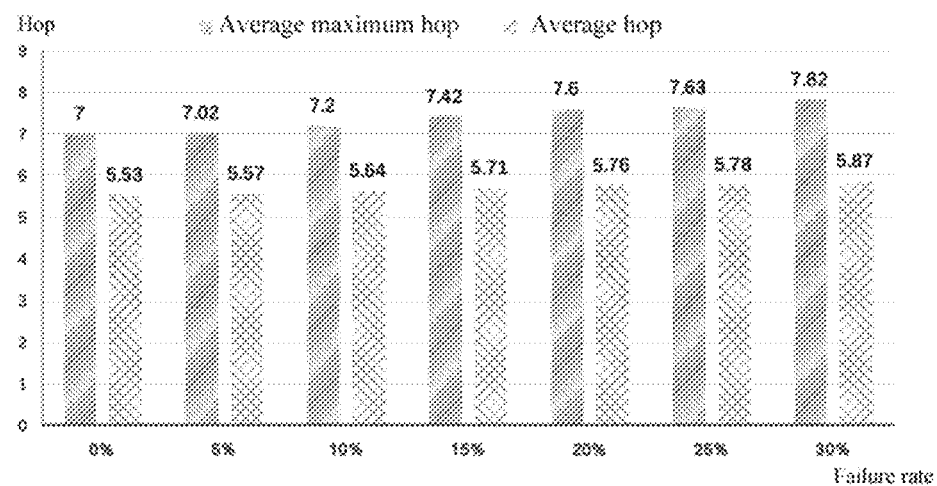
FIG. 9D is a schematic diagram of a failure rate and hops according to the embodiment of the disclosure.
Figure 9E:
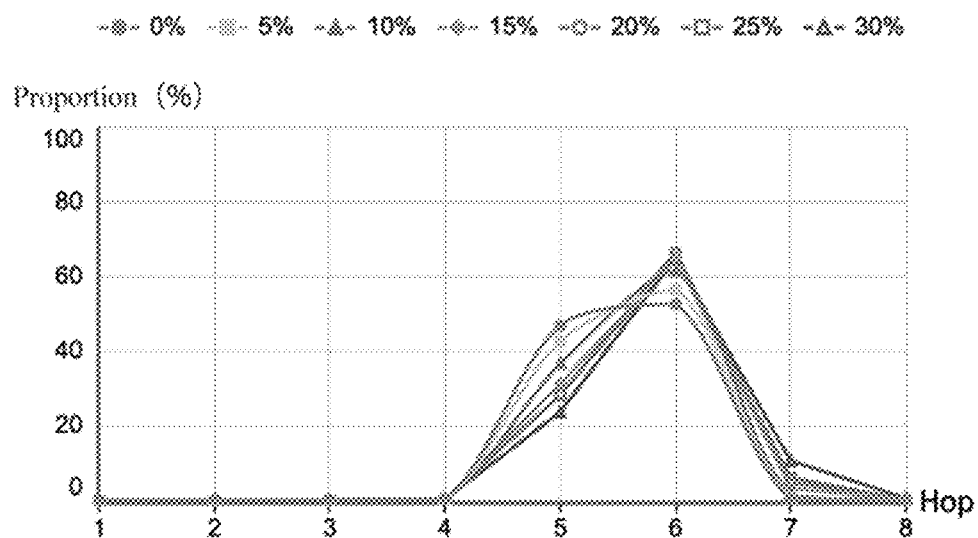
FIG. 9E is a schematic diagram of a failure rate and hop distribution according to the embodiment of the disclosure.
Figure 9F:
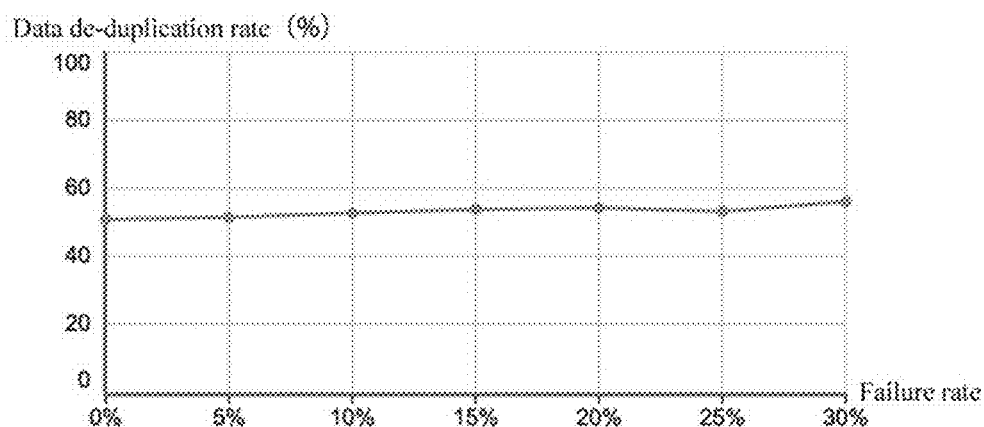
FIG. 9F is a schematic diagram of a failure rate and a de-duplication rate according to the embodiment of the disclosure.

As shown in FIG. 9D, with the failure rate of nodes increasing, both the average maximum hop and the average hop increase during the repair process. The average hop increases slowly, which proves that the repair process can still ensure the stability of the P2P network system although there are node failures in the transmission process. However, the increase of the maximum hop indicates that some nodes disconnected from other nodes are grafted onto other sub-trees, which leads to the increase of the average maximum hop. As shown in FIG. 9E, it can be seen that in the process of fault repair, some leaf nodes that only need 5 hops to the root node are disconnected from father nodes, and finally grafted to other leaf nodes with 5 hops, becoming nodes of 6 hops and very few nodes of 7 hops. In the repair process, the hops of the leaf nodes are also stable, mainly concentrated in 5, 6 and 7 hops, and the hops are not increased suddenly to cause an increase in query delay. Therefore, the fault tolerance of this solution is verified. Even in the repair process, the solution still has better query delay and balanced tree structure when the failure rate is below 30%. As shown in FIG. 9F, the de-duplication rate of the data received by the root node does not change with the change of the failure rate, but still fluctuates around 51%. This proves that the data de-duplication rate has nothing to do with the failure rate of nodes when the data is evenly distributed on the network. The data de-duplication rate reflects the data volume to be processed by the root node, determines the query load of the root node, and needs to be dynamically adjusted according to the CPU power of the root node.

Through the above experiments, the information such as the hop from the leaf node to the root node and the hop distribution is detected by taking the failure rate of nodes in the distributed ledger network as a variable, and it is verified that this method can broadcast the query message to the whole network within a few hops (5.87 hops) even under the condition of a failure rate of 30%. The hops are not increased obviously, and the hop distribution is still balanced. It is verified that the solution can ensure the availability of the query function when the failure rate of nodes exists, and the P2P network system acting as a core algorithm of the query function, has only changed slightly, which verifies the fault tolerance of the solution.

(III) Analysis of Influence of Outdegree of Nodes on Performances

At this point in the experiment, the only reference variable is the outdegree of nodes. The influence of the outdegree of nodes on the maximum hop and the data de-duplication rate of the P2P network system will be introduced in the following. The influence of the outdegree of nodes on the evaluation indexes of the query system are displayed in the experiment when the number of nodes is 10000, the failure rate is 0%, and the size of the outdegree of nodes is 3 to 10.

Figure 9G:
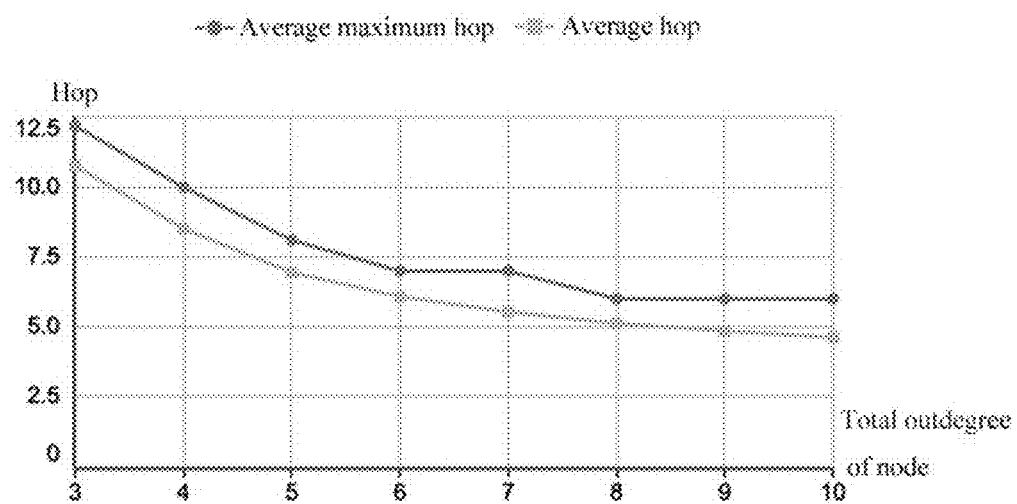
FIG. 9G is a structure diagram of a total outdegree of nodes and hops according to the embodiment of the disclosure.

As shown in FIG. 9G the greater the total outdegree of nodes is, the smaller the height of the P2P network system is. Because some child nodes of the nodes need to be reserved and placed in the Lazy List to recover from faults and increase the fault tolerance, the total outdegree is not the number of child nodes of all the nodes in the P2P network system, so the height of the tree of the P2P network system is slightly higher than log kN. But the average hop is in the range of log kN, which ensures that the tree is relatively balanced. When the total outdegree of nodes is 10, it only takes 6 hops to broadcast the query requests to the whole network and collect the query results from the whole network. In the current network environment, it is very easy to maintain a long connection between each node and 10 nodes. It is assumed that an average delay between two nodes is 100 ms, an average TPS of each node is 60 t/s, and the number of nodes is 10000. Then, it takes only 1.2 seconds to retrieve transaction data from BDChain with 10,000 nodes and 600,000 TPS, which is completely within an acceptance range of the user.

Figure 9H:
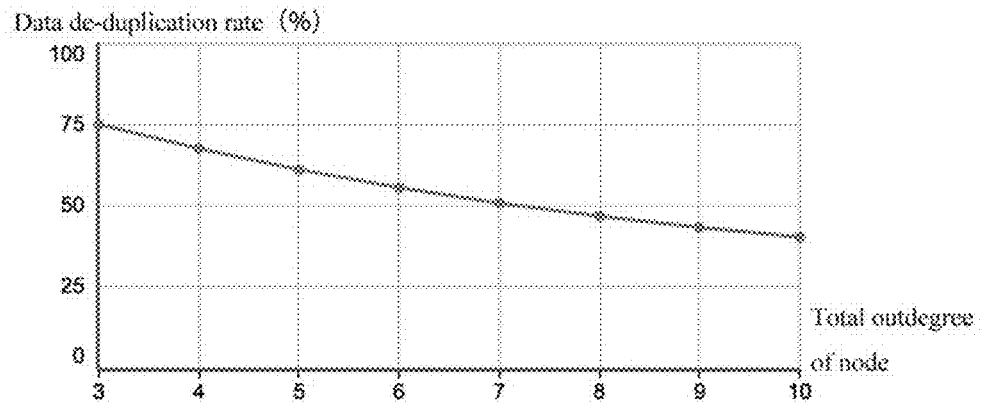
FIG. 9H is a structure diagram of a total outdegree of nodes and a de-duplication rate according to the embodiment of the disclosure.

As shown in FIG. 9H, the data de-duplication rate decreases with the increase of the total outdegree of nodes. Based on all the above experimental results, it can be seen that the data de-duplication rate is only related to the outdegree of nodes. The larger the outdegree of nodes is, the smaller the data de-duplication rate is, but the average maximum hop will decrease, and the query delay will reduce. The smaller the outdegree of nodes is, the larger the data de-duplication rate is, but the average maximum hop will increase, and the query delay will increase.

When the outdegree of nodes is 3, the de-duplication rate is as high as 75.19%, which greatly reduces a computing load of the root node. But correspondingly, the average maximum hop in transmission is as many as 12 hops. Therefore, the two needs to be balanced. When the CPU power of the node is poor, a small outdegree may be selected. Although the delay of the query process is increased, the processing load of the node is greatly reduced. When a higher query delay is required, and the CPU power of the node is strong, the outdegree of nodes may be increased, so as to reduce the query delay. Therefore, the outdegree of the node needs to be comprehensively determined by balancing the CPU power of the node, the delay requirement of the query and the bandwidth of the network environment, and each node on the BDChain can be configured with different outdegrees according to the above factors.

Figure 9I:
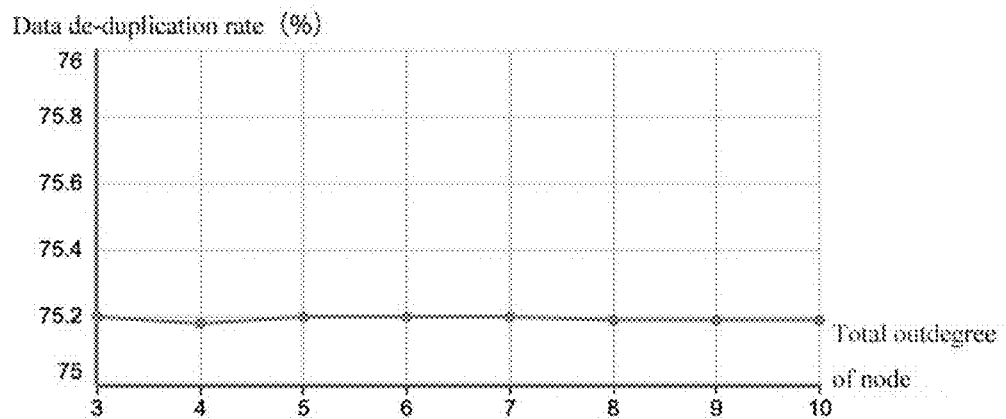
FIG. 9I is a structure diagram of a total outdegree of nodes and a de-duplication rate under a fixed outdegree of root node according to the embodiment of the disclosure.

The greater the outdegree of the root node is, the more the child nodes are, and each child node returns a query result. The query results are uniformly distributed on the whole network, so each child node receives approximately the same amount of data, and then transmits the query result to the root node. Therefore, the de-duplication rate of the root node should only be related to the root node. FIG. 9I shows a relation between the data de-duplication rate and the total outdegree of other nodes in an experimental environment that there are 10,000 nodes on the network, the total outdegree of all the nodes except the root node is 7, the outdegree of the root node is always 3, the failure rate of the node is 0%. Although the outdegree of the node except the root node is always changing, the data de-duplication rate is always fluctuating around 75.20%, and a amplitude of variation is only 0.01%, indicating that the data de-duplication rate of the root node has nothing to do with the outdegree of other nodes, but is only related to the outdegree of the root node. Therefore, the total outdegree of the node is determined according to the CPU power of the node, which can increase and reduce the processing load.

Figures 9J, 10A:
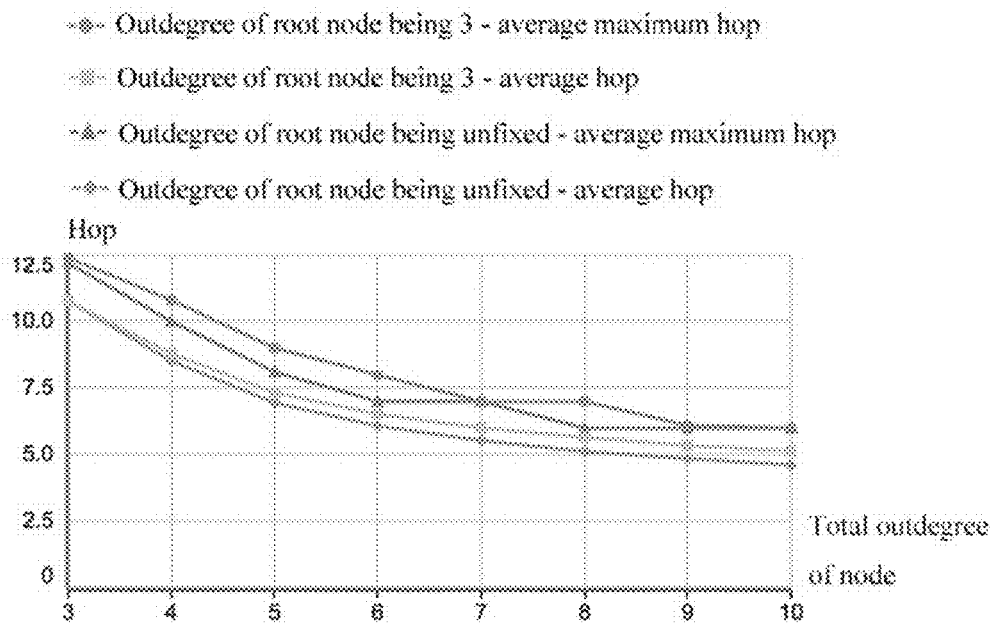
FIG. 9J is a structure diagram of a total outdegree of nodes and a de-duplication rate under a fixed outdegree of root node and an unfixed outdegree of root node according to the embodiment of the disclosure.
FIG. 10A is a schematic diagram of field description of query results.

It can be seen from the above experimental results that when the outdegree of the root node is not fixed, the outdegrees of all the nodes are the same, and the average hop of the P2P network system decreases with the increase of the outdegree of the node. However, fixing the outdegree of the root node according to the CPU power of the root node may affect the structure of the P2P network system. Therefore, it is necessary to verify the maximum hop and the average hop of the P2P network system when the root node is fixed and the outdegrees of other nodes change. FIG. 9J represents a relation between the average hop of the P2P network system and the total outdegree of nodes under the above conditions. It can be seen that when the outdegree of the root node is fixed, the average maximum hop and the average hop of the P2P network system are slightly different from those when the outdegree of the root node is not fixed. Therefore, determining the outdegree of the root node according to the CPU power of the root node will not have a great impact on the characteristics of the P2P network system. Through the above experiments, the outdegree of nodes is taken as a variable and the hops from the root node to the leaf node are used as an index to measure and detect the query delay, verifying that the greater the outdegree of the node is, the smaller the height of the P2P network system is and the lower the query delay is. However, the data de-duplication rate is taken as an index to detect the load of the root node, verifying that the greater the outdegree of the node is, the greater the load of the node is. By changing the outdegree of the node and fixing the outdegree of the root node, it can be verified that the load of the node is only related to the outdegree thereof, and has nothing to do with the outdegree of other nodes, so the load of the node can be reduced by reducing the outdegree of the node. As to whether reducing the load of the node will affect the query delay, an experiment as shown in FIG. 9J is done in this example, and it can be concluded that changing the outdegree of the root node will not greatly affect the query delay. Therefore, the outdegree of the node with smaller CPU power and bandwidth may be decreased to reduce the load of the node can be reduced without affecting the query delay, and the outdegree of the node may be dynamically adjusted according to the CPU power of the node, thus further improving the extendibility of the embodiment of the disclosure and further verifying the extendibility of the embodiment of the disclosure.

FIG. 9A to FIG. 9J respectively evaluate the extendibility, fault tolerance and load balance of the query system, and verify that the solution is extensible, fault tolerant and load balanced. An API of the query is tested and demonstrated below. For convenience of explanation, one API of a multi-conditional query request including condition query and range query is tested only. The test is implemented in such an environment of 10 Aliyun machines, a delay of 20 ms to 80 ms between the nodes, a maximum outdegree of 7 for each node, an optimized hop of 1, and no node failure.

FIG. 10A illustrates field descriptions of the query results, wherein transactionID is a unique identity of the transaction, from is an initiator of the transaction, to is a receiver of the transaction, timeStamp is a timestamp when the transaction is initiated, data and signature are binary representations of a data content and a data signature respectively; when an interface returns data, the contents in the figure are generated by Base64 encoding, and type is a type of the transaction, including uploading a contract, starting a contract, invoking a contract and ending a contract, and the like.

When there are differences in the transactions on the distributed ledger, traceability and audit functions shall be provided. For example, a user A and a user B have differences in the transactions occurring in a certain period of time, and the transactions need to be retrieved accurately. The query conditions of the test are all the transactions from 20: 05: 31 on May 12, 2019 to 20: 22: 21 on May 12, 2019, satisfying that an account address of the initiator is 7f18ee43-f142-439c-527a-442171780b38, and an account address of the receiver is 79a3bd9f-81bc-4403-4271-3d33e98b8ec0. As shown in FIG. 10B, the query delay is 66 ms, and only one transaction satisfies the query conditions.

The above examples respectively verify the extendibility, fault tolerance and load balance of the solution with the number of nodes, the failure rates and the outdegrees of the nodes as variables, and finally verify that the solution is extensible, fault tolerant and load balanced.

In the experimental environment with 10,000 nodes and a TPS of 60000/s, when the outdegree of each node is 7, it only takes 5.5 hops to broadcast the query conditions to all the nodes on average, and receive the query results returned by the nodes of the whole network. The data volume of the query result received by the root node is only 49% of the original data volume. When the outdegree of the root node is 3, the data volume of the query result received by the root node is only 25% of the original data volume. The processing load of the root node is greatly reduced by balancing the processing process of the whole query result to all the nodes in the whole network. It is proved in the analysis experiment of the influences of the failure rate on performances that all the nodes in the whole network can still receive the query message and return the correct query results in an average of 5.87 hops during the repair process of the P2P network system when the failure rate of the node is 30%. The influences of the outdegree of the node on the de-duplication rate are proved in the analysis experiment of the influences of the outdegree of the node on performances, and changing the outdegree of a certain node will not have a great influence on the evaluation index of the solution, so the total outdegree of the node can be specified according to comprehensive indexes such as the bandwidth and the CPU power of the node. In this way, the query delay will not be affected greatly, and the load of the query process can also be reduced. Therefore, the extendibility of the system can be further improved by dynamically adjusting the outdegree of the node according to the CPU power of the node, which further verifies the extendibility of the solution.

An API of the query system is evaluated later. It can be seen that the query delay for one time is 66 ms, and condition query, range query and multi-condition query are supported, solving the problem of single query function of the distributed Hash table. Moreover, this example completes core work in the query process, i.e., the maintenance of the P2P network system and the transmission of the query results, which provides an extensible architecture for implementing more types of queries subsequently.

It should be noted that, for the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

Figure 11:
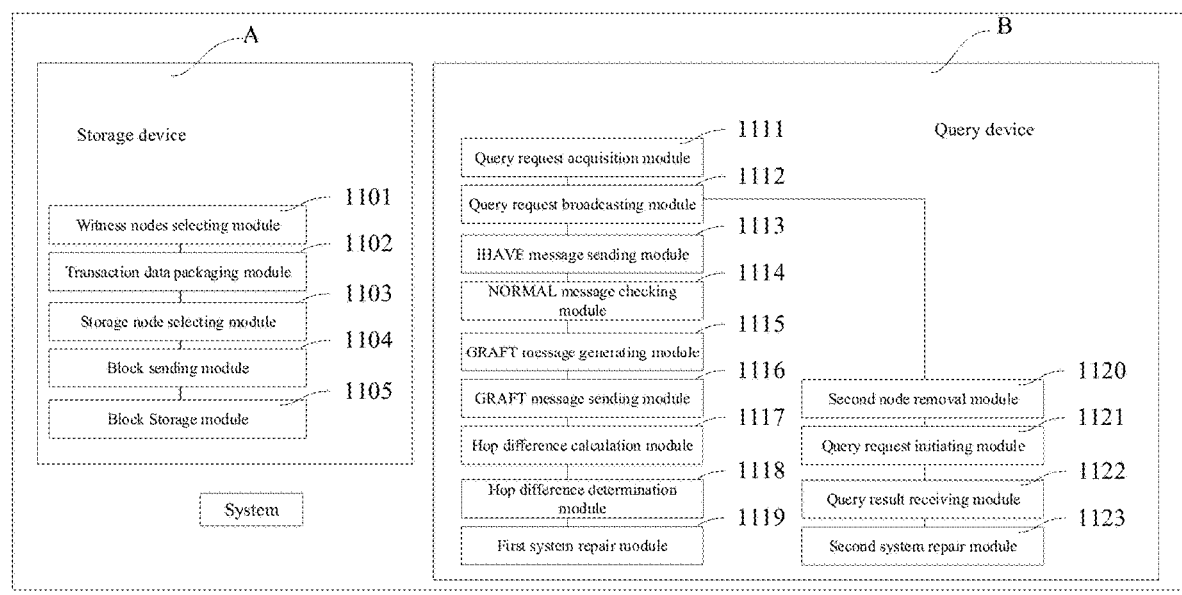
FIG. 11 is a structure diagram of a data-interoperability-oriented trusted processing system according to an embodiment of the disclosure.

FIG. 11 illustrates a structure diagram of a data-interoperability-oriented trusted processing system according to an embodiment of the disclosure, wherein the method is applied to a P2P network system, the P2P network system includes a plurality of nodes, the nodes include an Active List and a Passive List, and the Active List comprises an Eager List and a Lazy List; wherein a quantity of nodes in the Active List is a fixed value, and nodes establishing a TCP connection with the nodes on the P2P network system are stored in the Eager List for transmitting messages; remaining nodes in the Active List excluding the Eager List are stored in the Lazy List, and are used for transmitting a message digest or message ID, and used for optimization and fault tolerance of the P2P network system; random nodes are stored in the Passive List, and are used for replacing disconnected nodes in the Active List, to ensure a connection between the nodes and a network in the P2P network system; the system includes a storage device A and a query device B;

the storage device A includes:

a witness-node selecting module 1101 provided in a transaction initiating node in the P2P network system and used to, in a process of initiating a transaction, randomly select a plurality of witness nodes from the P2P network system for witnessing the transaction;

a transaction-data packaging module 1102 provided in the witness node and used to package transaction data generated by witnessing the transaction to generate blocks;

a storage-node selecting module 1103 provided in the witness node and used to randomly select a plurality of storage nodes from the P2P network system;

a block sending module 1104 provided in the witness node and used to send the blocks to the plurality of storage nodes; and a block storing module 1105 provided in the storage nodes and used to store the blocks, wherein, for one transaction, all the blocks of all the witness nodes and all the storage nodes form a directed acyclic graph DAG structure;

the query device B includes:

a query-request acquiring module 1111 provided in the first node and used to acquire a query request broadcast by a father node thereof in the P2P network system, the first node being any node in the P2P network system;

a query-request broadcasting module 1112 provided in the first node and used to broadcast the query request to a child node thereof through a tree maintenance program; wherein the child node is used to broadcast the query request to a corresponding child node thereof by using a tree structure of the P2P network system, and the corresponding child node thereof repeats the above broadcasting step till the query request has been broadcast to all nodes on the P2P network system; each of the nodes retrieves a local database after receiving the query request, waits for a result of the child node thereof, and after data returned by all the child nodes is collected, performs settlement and de-duplication operations, and returns a result to the father node thereof; after rounds of feedback, when the root node receiving the query request of a user receives the results returned by all the child nodes, the root node performs final settlement and de-duplication operations to generate a final query result and returns the final query result to the user;

the tree maintenance program includes an extensible maintenance program and a fault-tolerant maintenance program;

for the extensible maintenance program, the query device B includes:

an IHAVE-message sending module 1113 provided in the first node and used to, when the first node broadcasts the query request to the child node thereof, send, by the first node, an IHAVE message to a second node in the child node thereof, the IHAVE message including a message ID;

a NORMAL-message checking module 1114 provided in the second node and used to check whether a NORMAL message corresponding to the message ID and used for transmitting the query request is received by the NORMAL-message checking module;

a GRAFT-message generating module 1115 provided in the second node and used to generate a GRAFT message for repairing the P2P network system when the NORMAL message corresponding to the message ID is not received within a timeout period; the GRAFT message including the message ID and a request for receiving the IHAVE message; and a GRAFT-message sending module 1116 provided in the second node and used to, when the NORMAL message corresponding to the message ID is not received within the timeout period, send the GRAFT message to the first node, and move the first node from a Lazy List to an Eager List thereof, so that the first node repairs the P2P network system;

a hop-difference calculating module 1117 provided in the second node and used to calculate a difference between receiving hops of the IHAVE message and receiving hops of the NORMAL message when the NORMAL message corresponding to the message ID is received within the timeout period;

a hop-difference determining module 1118 provided in the second node and used to, when the NORMAL message corresponding to the message ID is received within the timeout period, determine whether the hop difference exceeds a hop threshold; and a first system repair module 1119 provided in the second node and used to repair the P2P network system when the hop difference exceeds the hop threshold; and for the fault-tolerant maintenance program, the query device includes:

a second-node removing module 1120 provided in the first node and used to remove the second node from the Eager List thereof when a connection between the first node and the second node constituting edges of the P2P network system is disconnected;

a query-request initiating module 1121 provided in the first node and used to initiate a query request to first target nodes in a Passive List of the first node in sequence; the query request including an instruction to check whether the first target nodes are online and an instruction to query a size of a Lazy List of the first target node;

a query-result receiving module 1122 provided in the first node and used to receive query results returned by each first target node for the query requests, and select a second target node with a smallest Lazy List and a lowest delay from the first target nodes according to delays in the query results and the sizes of the Lazy Lists of the first target nodes; and a second system repair module 1123 provided in the first node and used to add the second target node to the Lazy List of the first node, and use nodes in the Lazy List as substitute edges to repair the P2P network system.

As for the system embodiment, since it is basically similar to the method embodiment, the description of the device embodiment is relatively simple. For relevant points, please refer to the partial description of the method embodiment.

The embodiments in the disclosure are all described step by step, the important part of each embodiment mainly lies in the difference between other embodiments, the same or similar part between each embodiment may be referred to each other.

The data-interoperability-oriented trusted processing method and the data-interoperability-oriented trusted processing system provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

What is claimed is:

1. A data-interoperability-oriented trusted processing method, wherein the data-interoperability-oriented trusted processing method is applied to a P2P network system,
the P2P network system comprises a plurality of nodes,
the plurality of nodes comprise an Active List and a Passive List, and the Active List comprises an Eager List and a Lazy List;
wherein a quantity of nodes in the Active List is a fixed value, and third nodes establishing a TCP connection with the plurality of nodes on the P2P network system are stored in the Eager List for transmitting messages;

fourth nodes are remaining nodes in the Active List excluding the third nodes of the Eager List, wherein the fourth nodes are stored in the Lazy List, and the fourth nodes are configured for transmitting a message digest or a message ID, and for optimization and fault tolerance of the P2P network system;

random nodes are stored in the Passive List, and are configured for replacing disconnected nodes in the Active List, to ensure a connection between the plurality of nodes and a network in the P2P network system;

the data-interoperability-oriented trusted processing method comprises a storage method and a query method;

the storage method comprises:

in a process of initiating a transaction, randomly selecting, by a transaction initiating node in the P2P network system, a plurality of witness nodes from the P2P network system for witnessing the transaction;

packaging, by the plurality of witness nodes, transaction data generated by witnessing the transaction to generate blocks;

randomly selecting, by the plurality of witness nodes, a plurality of storage nodes from the P2P network system;

sending, by the plurality of witness nodes, the blocks to the plurality of storage nodes; and storing, by the plurality of storage nodes, the blocks, wherein, for the transaction, the blocks of the plurality of witness nodes and the plurality of storage nodes form a directed acyclic graph (DAG) structure;

the query method comprises:

in the P2P network system, acquiring, by a first node, a query request broadcast by a father node of the first node, wherein the first node is a node of the plurality of nodes in the P2P network system;

broadcasting, by the first node, the query request to a child node of the first node through a tree maintenance program; wherein the child node is configured to broadcast the query request to the child node of the first node by using a tree structure of the P2P network system, and the child node of the first node repeats the step of broadcasting, by the first node, the query request to the child node of the first node through the tree maintenance program till the query request has been broadcast to the plurality of nodes on the P2P network system; each of the plurality of nodes retrieves a local database after receiving the query request, waits for a result of the child node of the first node, and after data returned by the child nodes is collected, each of the plurality of nodes performs settlement and de-duplication operations, and returns a result to the father node of the first node; after rounds of feedback, when a root node receiving the query request of a user receives the results returned by the child nodes, the root node performs final settlement and de-duplication operations to generate a final query result and returns the final query result to the user;

the tree maintenance program comprises an extensible maintenance program and a fault-tolerant maintenance program;

for the extensible maintenance program, the query method comprises:

when the first node broadcasts the query request to the child node of the first node, sending, by the first node, an IHAVE message to a second node in the child node of the first node, the IHAVE message comprising the message ID;

checking, by the second node, whether a NORMAL message corresponding to the message ID and configured for transmitting the query request is received by the second node;

if the second node does not receive the NORMAL message corresponding to the message ID within a timeout period, performing the following steps of:

generating, by the second node, a GRAFT message for repairing the P2P network system, the GRAFT message comprising the message ID and a request for receiving the IHAVE message;

by the second node, sending the GRAFT message to the first node, and moving the first node from a Lazy List of the first node to an Eager List of the first node, wherein the first node repairs the P2P network system;

if the second node receives the NORMAL message corresponding to the message ID within the timeout period, performing the following steps of:

calculating, by the second node, a hop difference between receiving hops of the IHAVE message and receiving hops of the NORMAL message;

determining, by the second node, whether the hop difference exceeds a hop threshold; and if the hop difference exceeds the hop threshold, repairing, by the second node, the P2P network system; and for the fault-tolerant maintenance program, the query method comprises:

when a connection between the first node and the second node constituting edges of the P2P network system is disconnected, removing, by the first node, the second node from the Eager List of the first node;

initiating, by the first node, the query request to first target nodes in a Passive List of the first node in sequence, the query request comprising an instruction configured to check whether the first target nodes are online and an instruction configured to query a size of a Lazy List of the first target nodes;

by the first node, receiving query results returned by the first target nodes for the query requests, and selecting a second target node with a smallest Lazy List and a lowest delay from the first target nodes according to delays in the query results and the sizes of the Lazy Lists of the first target nodes; and by the first node, adding the second target node to the Lazy List of the first node, and using the fourth nodes in the Lazy List as substitute edges to repair the P2P network system.

2. The data-interoperability-oriented trusted processing method according to claim 1, wherein the storage method comprises: in the DAG structure, each of the blocks has a plurality of preceding blocks and a plurality of subsequent blocks.

3. The data-interoperability-oriented trusted processing method according to claim 2, wherein each of the blocks comprises a block header and a block body, wherein the block header comprises IDs of the plurality of preceding blocks, a witness node signature, a timestamp, a unique identity Nonce, a data chain version, a number of the blocks and a Merkle Tree root, and the block body comprises the transaction data.

4. The data-interoperability-oriented trusted processing method according to claim 1, wherein for the transaction, a quantity of the plurality of witness nodes is three, and a quantity of the plurality of storage nodes selected by each of the plurality of witness nodes is three.

5. The data-interoperability-oriented trusted processing method according to claim 1,
wherein the P2P network system comprises a BroadcastTree protocol, an MsgTransferProt protocol and a PartialView protocol,
wherein the BroadcastTree protocol is configured for maintaining the P2P network system;
the MsgTransferProt protocol is configured for broadcasting a query message and verifying and transmitting a query result; and
the PartialView protocol is configured for managing neighbor nodes of each node of the plurality of nodes, wherein the neighbor nodes comprise the father node and the child node; and wherein the Active List and the Passive List are located in the PartialView protocol of the P2P network system;
each of the plurality of nodes comprises a first Map cache, a second Map cache and a third Map cache,
wherein the first Map cache is ReceivedMsgMap, stores a mapping of the message ID and a message, and is configured for caching a currently received message to respond to requests to the message from fifth nodes, and the fifth nodes do not receive the message;
the second Map cache is NotReceivedMsgMap, and caches a mapping between the message ID and a node sending the message, and if the message sent by the third node in the Eager List is not received when a specified time period is reached, the second Map cache triggers a Timer to request the message from the node sending the message and repair the P2P network system; and
the third Map cache is TimingCacheMsgMap, and is configured for caching the currently received message, and if the message sent by the fourth nodes in the Lazy List is received within a specified time range, comparing hops of the message and the currently received message to determine whether to optimize the P2P network system.

6. The data-interoperability-oriented trusted processing method according to claim 5,
wherein the query method comprises:
when the second node receives the message, checking, by using the ReceivedMsgMap, whether the IHAVE message or the NORMAL message is received;
if the IHAVE message or the NORMAL message is received, discarding the message;
if the IHAVE message and the NORMAL message are not received, checking whether an ID of the IHAVE message or an ID of the NORMAL message is received; and
if the ID of the IHAVE message or the ID of the NORMAL message is not received, discarding the message;
if the ID of the IHAVE message or the ID of the NORMAL message is received, adding the ID of the IHAVE message or the ID of the NORMAL message into the NotReceivedMsgMap, and setting the IHAVE message or the NORMAL message as a timeout event.

7. The data-interoperability-oriented trusted processing method according to claim 1,
wherein for the fault-tolerant maintenance program, the query method further comprises:
generating, by the first node, a fixed hop TTL when a quantity of online nodes in the Passive List in the first node is less than a preset threshold;
sending, by the first node, a message carrying the fixed hop TTL to a random third target node in the Eager List of the first node; after receiving the message by the third target node, sending, by the third target node, a node ID in a latest Passive List of the first node to the first node and subtracting 1 from the fixed hop TTL by the third target node, then randomly sending the fixed hop TTL to random nodes in an Eager List of the third target node by the third target node, and repeating the above steps till the fixed hop TTL is 0; and
by the first node, summarizing the node IDs, randomly selecting M nodes from received nodes, and adding the M nodes to the Passive List, wherein M is equal to a maximum quantity of nodes configured to be stored in the Passive List minus a quantity of the random nodes stored in the Passive List.

8. The data-interoperability-oriented trusted processing method according to claim 1,
wherein before adding the first node into the P2P network system, the data-interoperability-oriented trusted processing method comprises:
by the first node, acquiring a part of topology information of the P2P network system and using the topology information to initialize the Eager List, the Lazy List and the Passive List of the first node;
after the Eager List, the Lazy List and the Passive List are completely initialized, respectively establishing, by the first node, the TCP connection with the fourth nodes in the Eager List of the first node to form the edge of the P2P network system; and
repairing, by the first node, the P2P network system by using the fourth nodes in the Lazy List as the substitute edges, wherein merely one edge with a fast transmission speed and a least quantity of hops is preserved, and the remaining nodes are finally removed to the Lazy List.

9. The data-interoperability-oriented trusted processing method according to claim 8,
wherein the topology information comprises a randomly allocated NodeID; and the step of by the first node, acquiring, the part of the topology information of the P2P network system and using the topology information to initialize the Eager List, the Lazy List and the Passive List of the first node comprises:
initiating, by the first node, a request to the network of the P2P network system by using the randomly allocated NodeID and a KAD algorithm to find a neighbor node closest to the randomly allocated NodeID; and
selecting, by the first node, a part of the neighbor nodes to initialize the Eager List, the Lazy List and the Passive List of the first node.

* * * * *